US011012976B2

(12) United States Patent
Rico Alvarino et al.

(10) Patent No.: US 11,012,976 B2
(45) Date of Patent: May 18, 2021

(54) BROADCAST CHANNEL REPETITION

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 15/194,045

(22) Filed: Jun. 27, 2016

(65) Prior Publication Data

US 2017/0006578 A1 Jan. 5, 2017

Related U.S. Application Data

(60) Provisional application No. 62/188,463, filed on Jul. 2, 2015.

(51) Int. Cl.
*H04W 72/00* (2009.01)
*H04L 5/00* (2006.01)
(Continued)

(52) U.S. Cl.
CPC ......... *H04W 72/005* (2013.01); *H04L 1/0038* (2013.01); *H04L 5/005* (2013.01);
(Continued)

(58) Field of Classification Search
CPC .. H04W 72/005; H04L 5/0048; H04L 1/0038; H04L 5/0053; H04L 5/005; H04L 27/2602; H04L 5/0007
See application file for complete search history.

(56) References Cited

U.S. PATENT DOCUMENTS 8,565,065 B2 10/2013 Cheng et al.
9,705,653 B2 7/2017 Chen et al.
(Continued)

FOREIGN PATENT DOCUMENTS

JP 2014132740 A 7/2014
JP 2016539522 A 12/2016
(Continued)

OTHER PUBLICATIONS

ISA/EP, International Search Report and Written Opinion of the International Searching Authority, Int'l Application No. PCT/US2016/039896, dated Sep. 2, 2016, European Patent Office, Rijswijk, NL, 13 pgs.

(Continued)

*Primary Examiner* — Justin T Van Roie
(74) *Attorney, Agent, or Firm* — Dalei Dong; Holland & Hart LLP

(57) ABSTRACT

Methods, systems, and devices for wireless communication are described. A device may receive repeated portions (e.g., modulation symbols) of a physical broadcast channel (PBCH) within a subframe. Portions of a PBCH may be repeated during various symbol periods of a subframe, and symbol periods for repetition may be selected based at least in part on locations of reference signals, synchronization signals, or downlink transmissions. Symbol periods that include cell-specific reference signals (CRS) may be used to repeat portions of a PBCH. Modulation symbols of a PBCH that include both broadcast information and CRS may be repeated within a subframe during symbol periods of the subframe than include CRS. Repetitions of portions of the PBCH in the subsequent subframe may be similarly or differently mapped to available resources in the subsequent subframe. Devices may identify characteristics of the PBCH by using differences in phase between repeated portions of the PBCH.

44 Claims, 24 Drawing Sheets

(51) Int. Cl.
   *H04L 1/00*     (2006.01)
   *H04L 27/26*    (2006.01)

(52) U.S. Cl.
   CPC .......... *H04L 5/0048* (2013.01); *H04L 5/0053* (2013.01); *H04L 5/0007* (2013.01); *H04L 27/2602* (2013.01)

(56) References Cited

U.S. PATENT DOCUMENTS

| | | |
|---|---|---|
| 2015/0043420 A1 | 2/2015 | Xiong et al. |
| 2015/0078300 A1 | 3/2015 | Xu et al. |
| 2015/0085717 A1* | 3/2015 | Papasakellariou ........ H04L 5/14 370/280 |
| 2015/0085795 A1 | 3/2015 | Papasakellariou et al. |

FOREIGN PATENT DOCUMENTS

| | | |
|---|---|---|
| WO | WO-2010008780 A1 | 1/2010 |
| WO | WO-2010129606 A1 | 11/2010 |
| WO | WO-2015046928 A1 | 4/2015 |

OTHER PUBLICATIONS

Motorola, "Downlink Reference Signal Sequence Design," 3GPP TSG RAN WG1 Meeting #46, R1-062071, Tallinn, Estonia, Aug. 28-Sep. 1, 2006, 4 pgs., XP050102616, 3rd Generation Partnership Project.
Taiwan Search Report—TW105120615—TIPO—dated Feb. 3, 2020.

* cited by examiner

BROADCAST CHANNEL REPETITION

CROSS REFERENCES

The present Application for Patent claims priority to U.S. Provisional Patent Application No. 62/188,463 by Rico Alvarino et al., entitled "Broadcast Channel Repetition" filed Jul. 2, 2015, assigned to the assignee hereof.

BACKGROUND

The following relates generally to wireless communication and more specifically to mapping a broadcast channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some UEs within the coverage area of a base station may have a relatively more difficult time acquiring system information from the base station. For instance, a UE may be near the edge of a coverage area, may be stationary, may be in an environment that is unconducive to wireless communication, or the like. These UEs, as well as UEs operating with better communication link conditions, may benefit from more opportunities to receive system information that may be broadcast by a base station.

SUMMARY

A system may provide for repeated portions (e.g., modulation symbols) of a physical broadcast channel (PBCH) to be transmitted within a subframe or in multiple subframes of a system frame. A base station may transmit subframes with PBCH repeated during various symbol periods of a subframe. Symbol periods of the subframe used for repetition may be selected based at least in part on locations of reference signals, synchronization signals, control information, data transmissions, or the like, within the subframe. For subframes that include a PBCH (e.g., SF0 in LTE), additional symbol periods of the subframe, including with cell-specific reference signals (CRS), may be used to repeat portions of a PBCH. By way of example, modulation symbols of a PBCH that include both broadcast information and CRS may be repeated within a subframe during symbol periods of the subframe than include CRS. Repetitions of portions of the PBCH in the subsequent subframe may be similarly or differently mapped to available resources in the subsequent subframe.

Devices that receive subframes with PBCH repetitions may identify characteristics of the PBCH by using differences in phase between the repetitions. For instance, a device that receives repeated portions of a PBCH may perform frequency estimation or determine that the received signal is indeed PBCH.

A method of wireless communication is described. The method may include identifying a PBCH in a first subframe of a frame, identifying a CRS pattern of the first subframe, mapping a first repetition of a portion of the PBCH to a symbol period of the first subframe, the symbol period comprising CRS, and transmitting the first subframe.

An apparatus for wireless communication is described. The apparatus may include means for identifying a PBCH in a first subframe of a frame, means for identifying a CRS pattern of the first subframe, means for mapping a first repetition of a portion of the PBCH to a symbol period of the first subframe, the symbol period comprising CRS, and means for transmitting the first subframe.

A further apparatus for wireless communication is described. The apparatus may include a processor, memory in electronic communication with the processor, and instructions stored in the memory and operable, when executed by the processor, to cause the apparatus to identify a PBCH in a first subframe of a frame, identify a CRS pattern of the first subframe, map a first repetition of a portion of the PBCH to a symbol period of the first subframe, the symbol period comprising CRS, and transmit the first subframe.

A non-transitory computer-readable medium storing code for wireless communication is described. The code may include instructions executable to identify a PBCH in a first subframe of a frame, identify a CRS pattern of the first subframe, map a first repetition of a portion of the PBCH to a symbol period of the first subframe, the symbol period comprising CRS, and transmit the first subframe.

In some examples of the method, apparatuses, or non-transitory computer-readable medium described herein, the identifying the PBCH in the first subframe comprises identifying a first set of symbols comprising portions of the PBCH and CRS, and identifying a second set of symbols comprising portions of the PBCH without the CRS. Additionally or alternatively, in some examples the mapping the first repetition of the portion of the PBCH comprises identifying a first symbol period of the first subframe that is available for PBCH repetition, the first symbol period comprising CRS, and repeating at least one symbol of the first set of symbols during the first symbol period.

Some examples of the method, apparatuses, or non-transitory computer-readable medium described herein may further include processes, features, means, or instructions for identifying a second symbol period that is available for PBCH repetition, the second symbol period excluding CRS, and repeating a symbol of the second set of symbols during the second symbol period. Additionally or alternatively, some examples may include processes, features, means, or instructions for identifying a CRS pattern of a second subframe of the frame, mapping each portion of the PBCH to the second subframe of the frame, mapping a second repetition of the portion of the PBCH to a symbol period of the second subframe, the symbol period comprising CRS, and transmitting the second subframe.

In some examples of the method, apparatuses, or non-transitory computer-readable medium described herein, the CRS patterns of the first and second subframes each comprise a same CRS pattern and the portion of the PBCH is mapped to corresponding sets of symbol periods in the first and second subframes. Additionally or alternatively, some examples may include processes, features, means, or instructions for mapping a third repetition of a second portion of the PBCH to a symbol period of the second subframe without the CRS, wherein a subset of subcarriers exclude the PBCH in the symbol period of the second subframe.

In some examples of the method, apparatuses, or non-transitory computer-readable medium described herein, the first and second subframes each comprise a same CRS pattern and each portion of the PBCH is repeated an equal number of times across the first and second subframes. Additionally or alternatively, in some examples the CRS patterns of the first and second subframes each comprise a same CRS pattern and the PBCH is mapped to different sets of symbol periods in each of the first and second subframes.

Some examples of the method, apparatuses, or non-transitory computer-readable medium described herein may further include processes, features, means, or instructions for mapping a third repetition comprising a portion of the PBCH to a symbol period of the second subframe without the CRS, wherein a subset of subcarriers exclude the PBCH in the symbol period of the second subframe. Additionally or alternatively, in some examples the PBCH is mapped based at least in part on a cell identification (ID).

Some examples of the method, apparatuses, or non-transitory computer-readable medium described herein may further include processes, features, means, or instructions for rotating each repeated portion of the PBCH by a phase based at least in part on a subcarrier index, a slot index, a cell identification, or a symbol index. Additionally or alternatively, in some examples the frame comprises a time division duplex (TDD) frame.

In some examples of the method, apparatuses, or non-transitory computer-readable medium described herein, the first subframe comprises subframe 0 (SF0) of the TDD frame and the second subframe comprises subframe 5 (SF5) of the TDD frame. Additionally or alternatively, in some examples the frame comprises a frequency division duplex (FDD) frame.

In some examples of the method, apparatuses, or non-transitory computer-readable medium described herein, the first subframe comprises subframe 0 (SF0) of the FDD frame and the second subframe comprises subframe 9 (SF9) of the FDD frame.

A method of wireless communication is described. The method may include receiving a PBCH in a subframe, wherein at least one symbol period of the subframe comprises a CRS and a repetition of a portion of the PBCH, and decoding the PBCH.

An apparatus for wireless communication is described. The apparatus may include means for receiving a PBCH in a subframe, wherein at least one symbol period of the subframe comprises a CRS and a repetition of a portion of the PBCH, and means for decoding the PBCH.

A further apparatus for wireless communication is described. The apparatus may include a processor, memory in electronic communication with the processor, and instructions stored in the memory and operable, when executed by the processor, to cause the apparatus to receive a PBCH in a subframe, wherein at least one symbol period of the subframe comprises a CRS and a repetition of a portion of the PBCH, and decode the PBCH.

A non-transitory computer-readable medium storing code for wireless communication is described. The code may include instructions executable to receive a PBCH in a subframe, wherein at least one symbol period of the subframe comprises a CRS and a repetition of a portion of the PBCH, and decode the PBCH.

Some examples of the method, apparatuses, or non-transitory computer-readable medium described herein may further include processes, features, means, or instructions for blindly detecting the PBCH. Blindly detecting the PBCH may include determining a repetition pattern of the portion of the PBCH and monitoring for the PBCH in the subframe based at least in part on the repetition pattern of the portion of the PBCH. In some examples, monitoring for the PBCH in the subframe based at least in part on the repetition pattern includes identifying a set of candidate locations in the subframe for the PBCH based at least in part on the repetition pattern. Additionally or alternatively, some examples may include processes, features, means, or instructions for determining a repetition pattern of portions of PBCH based at least in part on a cell identification (ID).

Some examples of the method, apparatuses, or non-transitory computer-readable medium described herein may further include processes, features, means, or instructions for de-rotating symbols comprising repeated portions of the PBCH by a phase based at least in part on a cell identification, a subcarrier index, a slot index, or a symbol index. In some examples, receiving the PBCH in the subframe comprises receiving the repetition of a portion of the PBCH in the subframe.

Some examples of the method, apparatuses, or non-transitory computer-readable medium described herein may further include processes, features, means, or instructions for estimating a frequency using at least the repeated portion of the PBCH. Additionally or alternatively, in some examples the frequency estimation is based at least in part on the CRS.

Some examples of the method, apparatuses, or non-transitory computer-readable medium described herein may further include processes, features, means, or instructions for identifying a signal in a symbol available for PBCH, and determining that the symbol available for PBCH comprises a repeated portion of the PBCH based at least in part on the identified signal.

BRIEF DESCRIPTION OF THE DRAWINGS

Aspects of the disclosure are described in reference to the following figures.

DETAILED DESCRIPTION

Figure 1:
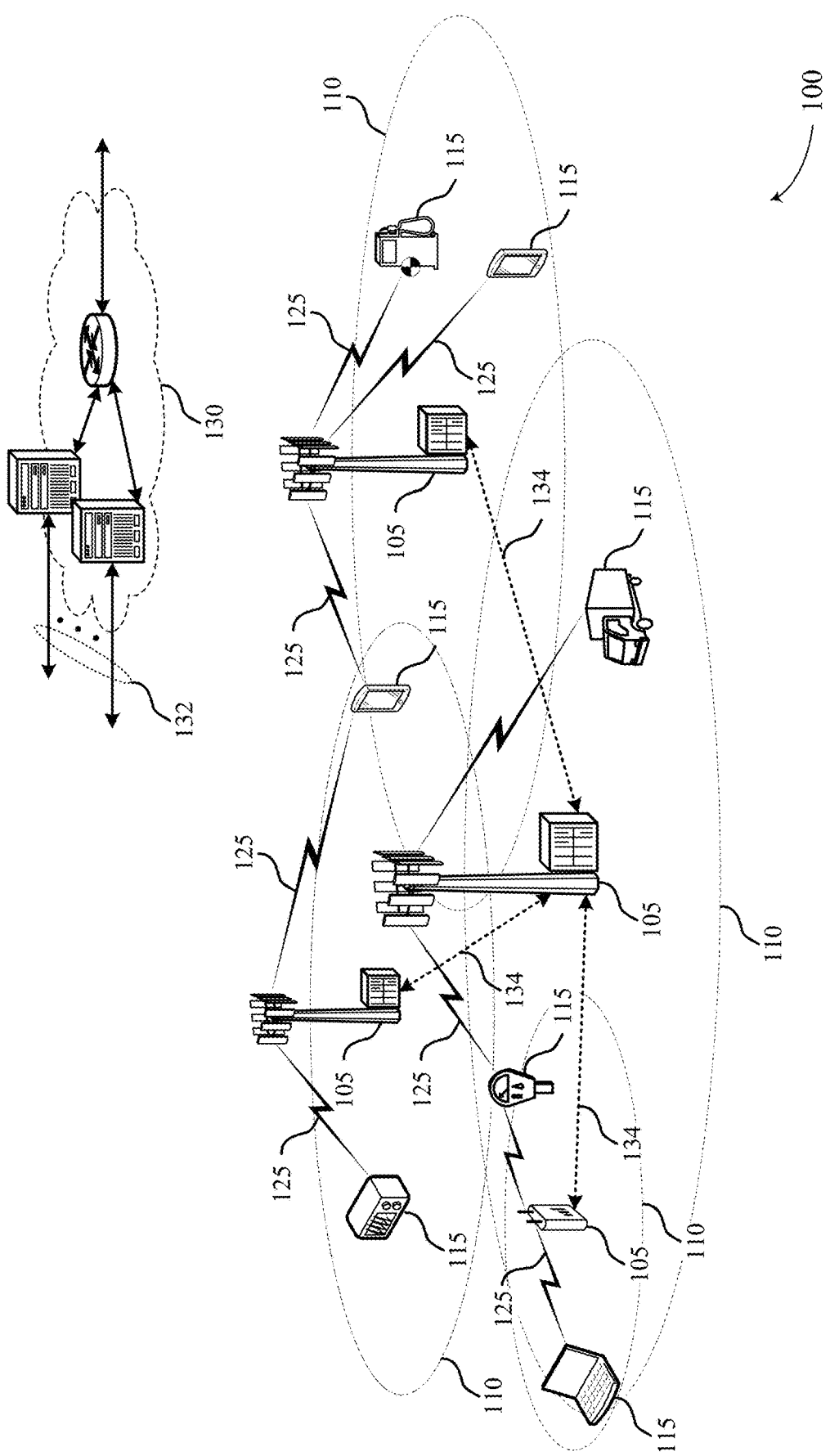
FIG. 1 illustrates an example of a wireless communications system that supports physical broadcast channel (PBCH) repetition in accordance with various aspects of the present disclosure.

In some instances, user equipment (UEs) in poor channel conditions may experience difficulty acquiring system information or broadcast transmissions from a base station. For example, devices with limited capabilities such as Machine Type Communication (MTC) devices or Machine-to-Machine (M2M) communication devices often operate under limited coverage. Accordingly, coverage for these devices may be improved using various techniques, such as repeated transmissions for coverage enhancement. A base station may transmit a subframe with repeated portions of a broadcast channel, such as a physical broadcast channel (PBCH), which may assist some user equipment (UEs) in the coverage area of the base station to receive and decode the broadcast channel. PBCH, for instance, may also be repeated several times within a system frame. By way of example, a base station may transmit subframes with PBCH repeated during various symbol periods of a subframe. Symbol periods of the subframe used for repetition may be selected based at least in part on locations of reference signals, synchronization signals, control information, data transmissions, or the like, within the subframe.

For subframes that include a PBCH (e.g., SF0 in LTE), additional symbol periods of the subframe, including with a cell-specific reference signal (CRS), may be used to repeat portions of a PBCH. Modulation symbols of a PBCH that include both broadcast information and CRS may be repeated within a subframe during symbol periods of the subframe that include CRS. Accordingly, a number of symbol periods of a subframe may be available for PBCH repetition, including those that include a reference signal. Leveraging more symbol periods in this manner may provide for a larger number of PBCH repetitions than would be available by relying solely on symbols without reference signals. Additionally, leveraging the symbol periods with CRS for PBCH repetition may allow for more portions of a PBCH to be repeated more frequently.

Repetitions of portions of the PBCH in the subsequent subframe may be similarly or differently mapped to available resources in the subsequent subframe. As discussed below, mapping of PBCH and a repetition of subframes may vary, depending on whether a frame is time-division duplexing (TDD) frame type or frequency-division duplexing (FDD) frame type.

In some examples, a base station identifies a subframe that includes PBCH. The base station may additionally determine that the subframe includes CRS, PDCCH, PSS/SSS, and unused or available resources for PBCH repetition. The base station may identify portions of the PBCH that may be repetitively mapped to the available resources within the subframe. In some cases, the base station may map the repetitions based at least in part on, or accounting for, a CRS pattern in the subframe. For instance, the base station may identify a portion of the PBCH that is multiplexed with CRS resources. The base station may then identify symbol periods within the subframe that include CRS resources and available resources and map repetitions of the identified portion to the identified symbol period. The base station may also identify and map portions of the PBCH that are not multiplexed with CRS resources to symbol periods that contain available resources and no CRS. The base station may transmit the subframe and a UE may identify and decode the PBCH using some or all of the repetitions.

In some cases, the base station may map the same PBCH to a second subframe and map PBCH repetitions to available resources similar to the mapping process described above. The base station may thus transmit a frame that has several subframes with PBCH. The UE may use the first or second subframes, or both, to decode PBCH. The repeated PBCH may thus increase the likelihood that a UE will successfully decode the PBCH.

Aspects of the disclosure introduced above are described in further detail below in the context of a wireless communication system. Specific examples are then described for mapping PBCH repetitions within a subframe and across several subframes. These and other aspects of the disclosure are further illustrated by and described with reference to apparatus diagrams, system diagrams, and flowcharts that relate to broadcast channel repetition.

FIG. 1 illustrates an example of a wireless communications system 100 that supports PBCH repetition in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, an MTC device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. MTC devices may benefit from PBCH repetition because, in some cases, they are stationary and subject to poor link quality. MTC UEs 115, in addition to other UEs 115, within the system 100 may thus be configured to support PBCH repetition as described herein.

LTE systems may utilize orthogonal frequency division multiple access (OFDMA) on the downlink (DL) and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands. Some MTC UEs 115 may operate in a narrow bandwidth compared to the full system bandwidth.

Carriers may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115. Some MTC UEs may be configured for half-duplex operation.

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. Uplink (UL) transport channels may include random access channel (RACH) for access and uplink shared channel (UL-SCH) for data. DL physical channels may include PBCH for broadcast information, physical control format indicator channel (PCFICH) for control format information, physical downlink control channel (PDCCH) for control and scheduling information, physical HARQ indicator channel (PHICH) for hybrid automatic repeat request (HARQ) status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data. While various channels may be repeated, the repetition of PBCH as described herein may be particularly advantageous because it may support system acquisition, including for MTC UEs 115.

PDCCH carries downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO) techniques, the DCI may include additional signaling information. DCI size and format depend on the amount of information as well as factors such as bandwidth, the number of antenna ports, and duplexing mode. Some wireless systems may use MTC PDCCH (MPDCCH) for control and scheduling information for MTC UEs. In some cases, the UE may use the same antenna ports for MPDCCH and PDSCH to enable channel estimation bundling across these channels. In some cases, legacy or a new common port may be used.

A base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based at least in part on the number of antenna ports or layers (up to 4) of the receiving UEs 115. In addition to CRS, which may be utilized by all UEs 115 in the geographic coverage area 110 of the base station 105, demodulation reference signal (DMRS) may be directed toward specific UEs 115 and may be transmitted on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). As described below, some reference signals may be transmitted in a pattern, and references (e.g., CRS) may be transmitted in symbol periods that include PBCH. Reference signal patterns may also be used to determine whether and where to repeat portions of PBCH.

As mentioned above, frame structure may be used to organize physical resources. A frame may be a 10 ms interval that may be further divided into 10 equally sized sub-frames. Each sub-frame may include two consecutive time slots. Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signal (CRS) and a UE-specific RS (UE-RS). UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be.

Time intervals in Long Term Evolution (LTE) may be expressed in multiples of a basic time unit (e.g., the sampling period, Ts=1/30,720,000 seconds). Time resources may be organized according to radio frames of length of 10 ms (Tf=307200·Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

In some cases, wireless communications system 100 may utilize coverage enhancement (CE) techniques to improve the quality of a communication link 125 for UEs 115 located at a cell edge, operating with low power transceivers, or experiencing high interference or path loss. CE techniques may include repeated transmissions, TTI bundling, HARQ retransmission, PUSCH hopping, beamforming, power boosting, repetitive transmissions, or other techniques. The CE techniques used may depend on the specific needs of UEs 115 in different circumstances. Repetitive transmission may involve transmitting the same OFDM symbol in multiple symbol periods during a subframe. In some cases, repetitive transmissions may be used to take advantage of unused resources present in a transmission over a PBCH. In some cases, repetitive transmissions may utilize contiguous or discontiguous resources. This process may be effective for reaching devices that are located in areas that routinely experience poor channel conditions. For instance, the repetitive transmissions may increase the likelihood that a relatively stationary MTC device (e.g., a meter) will receive and decode PBCH transmissions.

A base station 105 may utilize repetitive data transmissions within a subframe or may transmit multiple subframes that carry the same information within a frame. In some examples, a base station 105 transmits PBCH in a first subframe along with CRS, synchronization signals, control information, data, and the like. The base station 105 may map portions of the PBCH to available resources to create repetitions of the portions within the first subframe. This mapping may be based at least in part on identifying which symbol periods within the first subframe include CRS resources. The base station 105 may additionally transmit the same PBCH in a subsequent subframe within the same radio frame as the first subframe. Repetitions of portions of the PBCH in the subsequent subframe may be similarly or differently mapped to available resources in the second subframe. A UE 115 may utilize the repetitions and the duplicate subframes to refine frequency and phase error estimates in addition to increasing the reliability of the data link.

Figure 2:
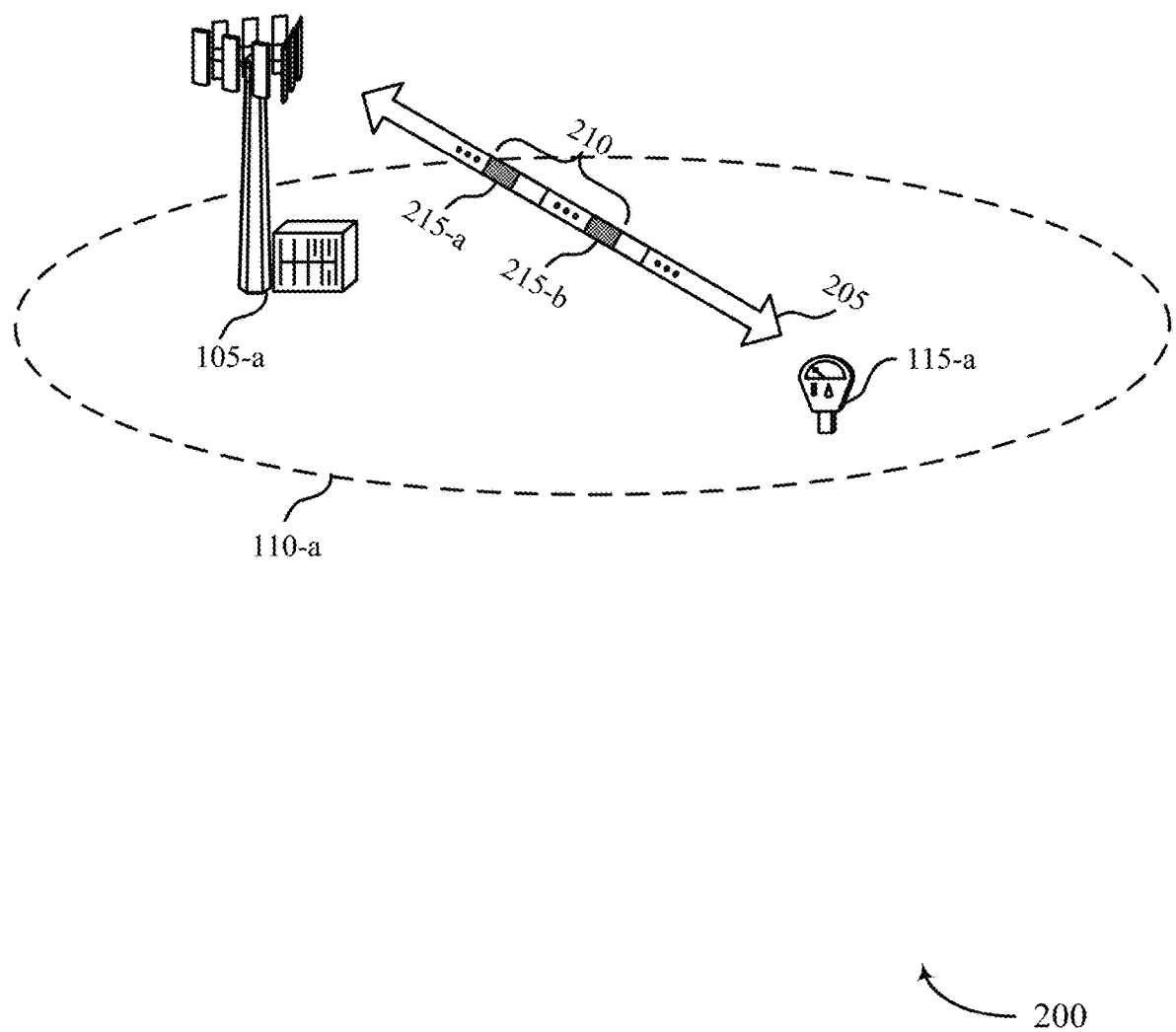
FIG. 2 illustrates an example of a wireless communications system that supports PBCH repetition in accordance with various aspects of the present disclosure.

FIG. 2 illustrates an example of a wireless communications system 200 for PBCH repetition for EMTC in accordance with various aspects of the present disclosure. Wireless communications system 200 may include UE 115-a and base station 105-a, which may be examples of a UE 115 or a base station 105, and may communicate with one another as described above with reference to FIG. 1. UE 115-a may receive and decode PBCH 215 transmissions via communication link 205. In some cases, UE 115-a may be an MTC device.

Wireless communications system 200, as mentioned above, may provide the UE 115-a access to the network. Prior to establishing communication link 125-a, the UE 115-a may perform time and frequency synchronization. For example the UE 115-a may leverage synchronization signals broadcast from the base station 105-a (e.g., a primary synchronization signal (PSS) and a secondary synchronization signal (SSS)) to initiate system synchronization. Once the PSS and SSS have been acquired, UE 115-a may determine the cell identity associated with base station 105-a and complete initial cell synchronization. Additionally, the UE 115-a may receive a master information block (MIB) on PBCH. The MIB may convey information that enables the UE 115-a to access system information from system information blocks (SIBs) (e.g., SIB1 and SIB2). Utilizing this information, the UE 115-a may complete the initial access procedure and establish communication link 125-a.

In some examples, base station 105-a uses PBCH repetition to increase the likelihood that UE 115-a will successfully receive and decode the PBCH, and thus increase the likelihood that the UE 115-a will receive important system information. In each radio frame 210, base station 105-a may transmit a first PBCH 215-a in a first subframe (e.g., SF0) and a second PBCH 215-b in a second subframe (e.g., SF5 for TDD or SF9 for FDD). The second PBCH 215-b may carry the same information as the first PBCH 215-a, and the symbols of the second PBCH 215-b may be configured similarly or differently as describe below. Multiple PBCH transmissions may be resistant to interference bursts and may enable UE 115-a to combine the PBCH 215 transmissions to assist or supporting the UE's 115-a decoding efforts.

In some cases, base station 105-a may allocate a full subframe to each PBCH 215 transmission. The resources needed to support the PBCH 215 transmissions may be less than the resources allocated to a subframe. For instance, for a resource allocation of 168 resource elements (i.e., 12 subcarriers and 14 symbols), 116 resource elements may be used to support PBCH 215 transmission. So base station 105-a may repeat within the subframe itself symbols modulated with PBCH. The repetitions may be such that the same modulation symbols are transmitted over the same tone during different symbol periods. This may enable UE 115-a to supplement frequency and phase error estimates derived from reference signal measurements.

FIGS. 3A-3E illustrate examples of FDD repetition patterns 300 for PBCH repetition in accordance with various aspects of the present disclosure. FDD repetition patterns 300 may illustrate aspects of a transmission between a UE 115 and a base station 105, as described above with reference to FIGS. 1-2. FDD repetition patterns 300 may include PDCCH 310 transmissions, CRS 315, PSS/SSS 320, PBCH symbols 305 (A to D), and repetitions of the PBCH symbols 305.

Figure 3A:
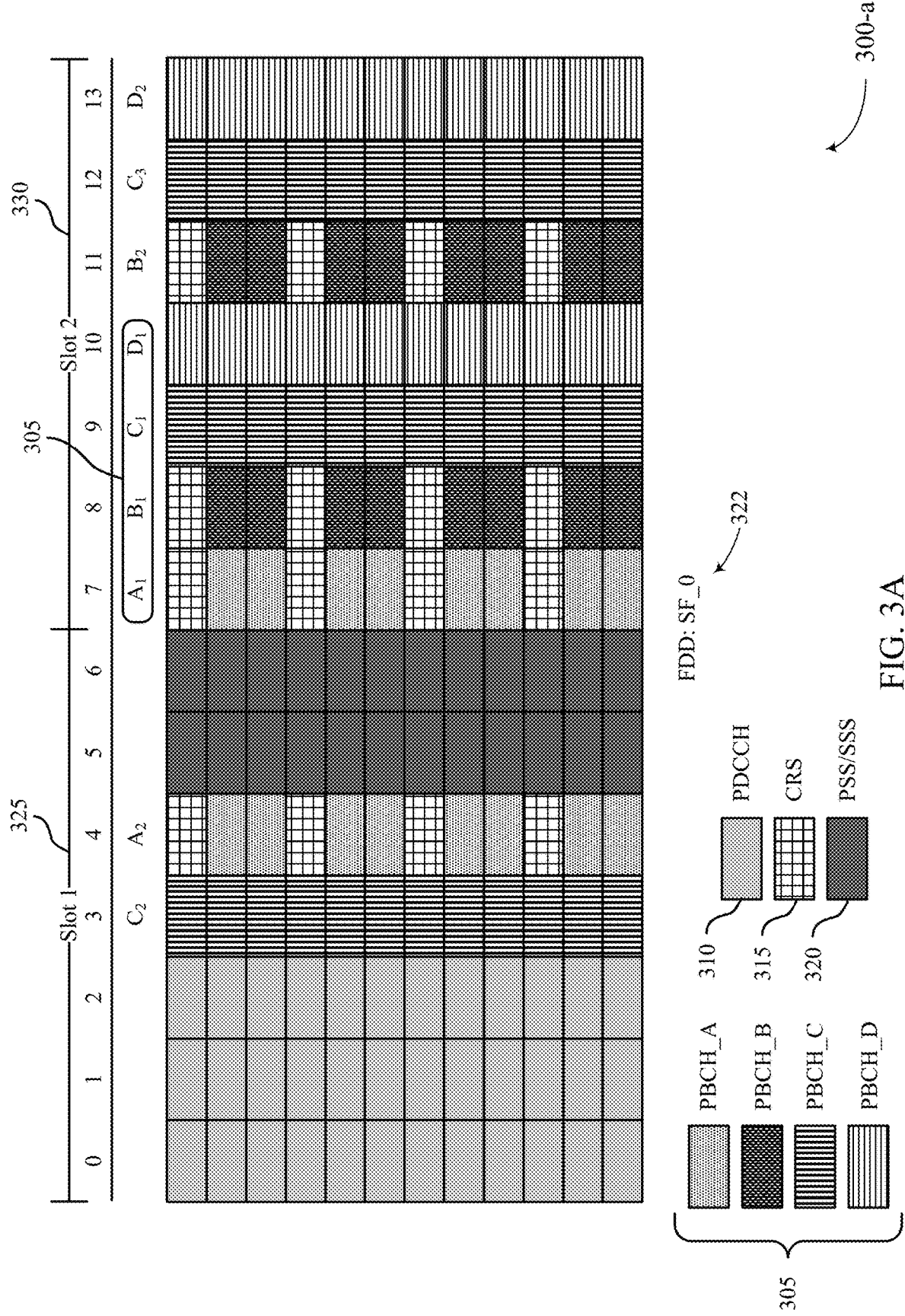
FIGS. 3A-3E illustrate examples of FDD repetition patterns for PBCH repetition for EMTC in accordance with various aspects of the present disclosure.

In FIG. 3A, a base station 105 may identify PBCH symbols 305 in a first subframe 322 (e.g., SF0) of an FDD radio frame. The subframe 322 may have a first slot 325 and a second slot 330. PBCH symbols 305 may include four consecutive OFDM symbols $A_1$, $B_1$, $C_1$, $D_1$, where the first OFDM symbol $A_1$ is located at the first symbol period of the second slot 330 (e.g., symbol period 7). The first and second OFDM symbols $A_1$ and $B_1$ may be multiplexed with CRS 315, while the third and fourth OFDM symbols $C_1$ and $D_1$ may use the full frequency allocation (e.g., 12 subcarriers). Symbol periods 0-3 may be occupied by the PDCCH 310, and symbol periods 5 and 6 may be occupied by PSS/SSS 320.

The base station 105 may identify unused resources (e.g., resources in symbol periods 3, 4, and 11-13) and distribute the OFDM symbol repetitions over the available resources. Base station 105 may determine that OFDM symbols that are multiplexed with CRS 315, such as $A_1$ and $B_1$, may be mapped to a symbol period that also includes CRS 315 (e.g., symbol periods 4 and 11). Base station 105 may similarly determine that OFDM symbols that utilize the full frequency allocation, such as $C_1$ and $D_1$, may be mapped to symbol periods that do not include CRS (e.g., symbol period 3, 4, 12, and 13). For example, as shown in FDD repetition 300-a, base station 105 may map OFDM symbol repetition $A_2$ to symbol period 4, OFDM symbol repetition $B_2$ to symbol period 11, OFDM symbol repetitions $C_2$ and $C_3$ to symbol periods 3 and 12, respectively, and OFDM symbol repetition $D_2$ to symbol period 13. Alternatively, the base station 105 may map a repetition of $D_1$ to symbol period 3, and a repetition of $C_1$ to symbol period 13. Multiple different mapping may be realized that satisfy the criteria that an OFDM symbol multiplexed with CRS 315 is mapped to a symbol period that includes CRS 315.

Figure 3B:
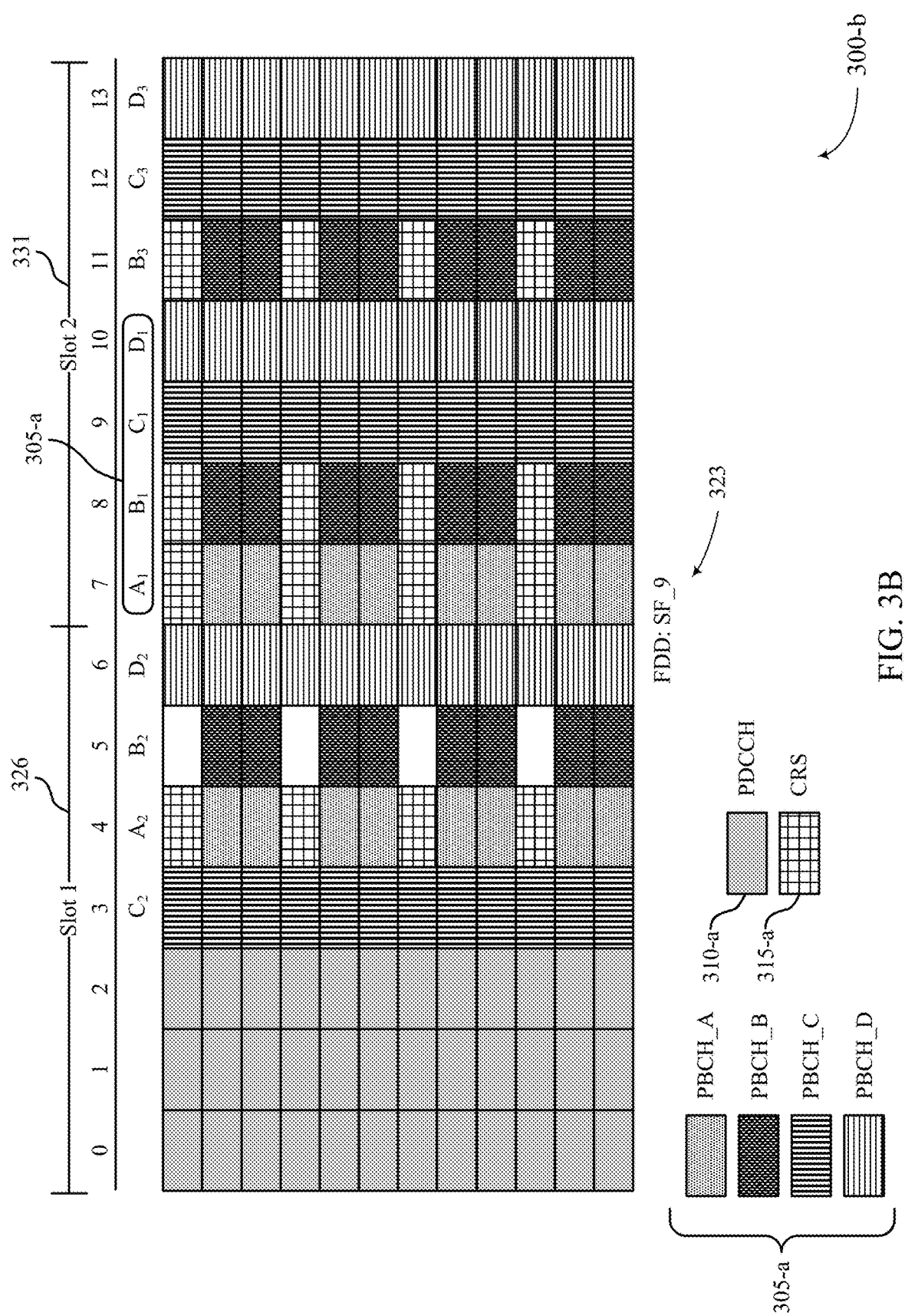

In FIGS. 3B-3E, the base station 105 may identify PBCH symbols 305 in a second subframe 323 (e.g., SF9) of an FDD radio frame. The second subframe may have a first slot 326 an a second slot 331. The second subframe 323 may also include PDCCH 310-a and CRS 315-a. The PBCH transmission and the second subframe 323 may be similarly configured as described above. In some cases, the subframe may not include SSS or PSS, which may provide additional resources for mapping OFDM symbol repetitions. FIG. 3B illustrates a mapping that shares characteristics with the mapping shown in FIG. 3A. For instance, the OFDM symbols mapped to symbol periods 3, 4, and 7-13 may be the same as the OFDM symbols mapped to these symbol periods in FDD repetition pattern 300-b. In this way, the phase difference between the first and second subframes may be used to determine additional frequency estimations. The base station 105 may then determine which OFDM symbol repetitions to map to the additional symbol periods 5 and 6. For instance, as shown in FDD repetition pattern 300-b, the base station 105 may map the OFDM symbol repetitions so that three of the OFDM symbols B, C, and D are repeated three times and so that one of the OFDM symbols A is repeated twice. This may result in a subframe that includes resource elements (i.e., a subcarrier within a symbol period) without a mapping of a channel or signal (e.g., PBCH), such as in symbol period 5.

Figure 3C:
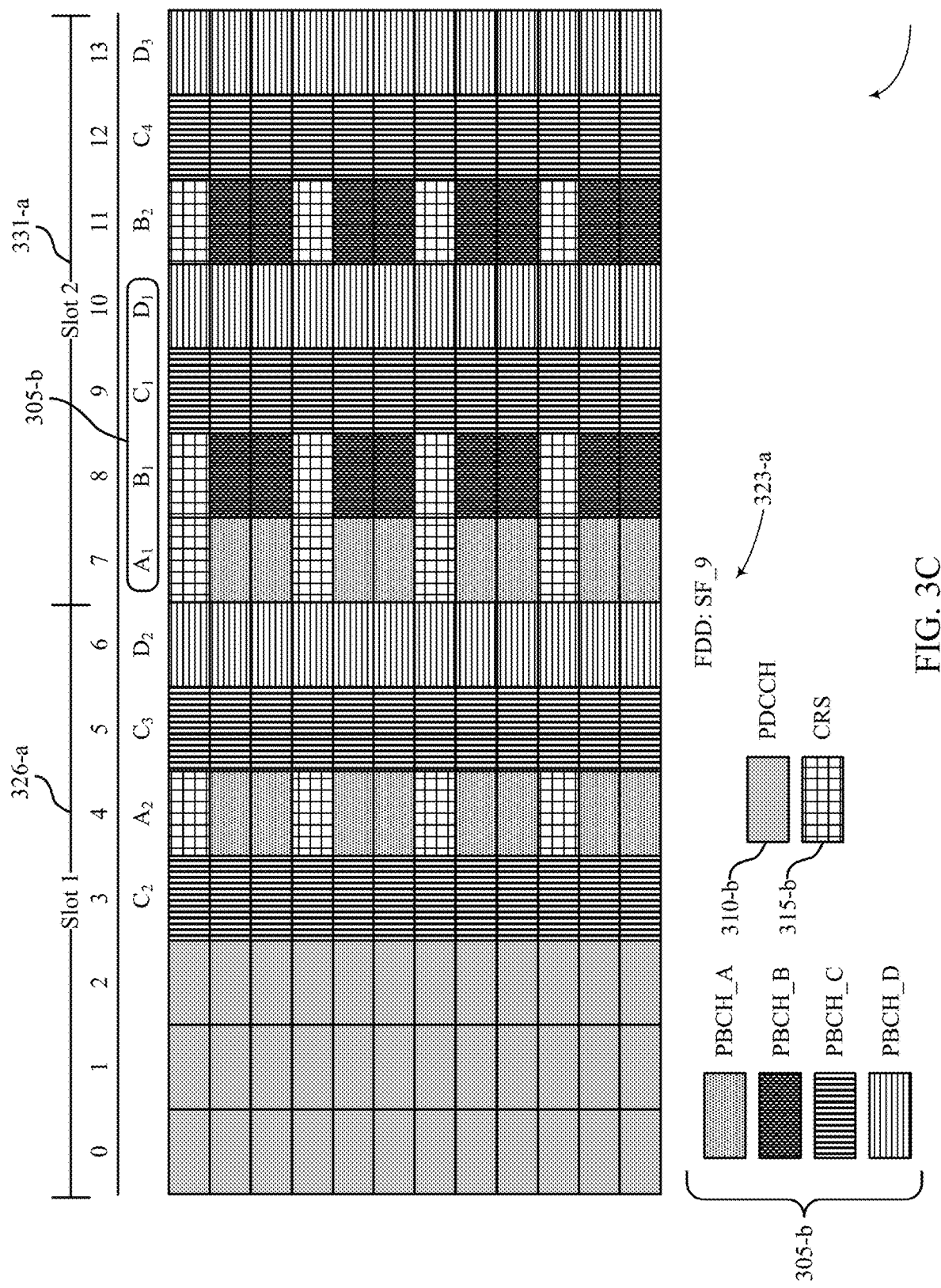

Alternatively, as shown in FIG. 3C, the third and fourth OFDM symbols $C_1$ and $D_1$ may be mapped to symbol periods 5 and 6. In this way, all of the resources within the second subframe may be utilized, and one symbol may be repeated four times, one symbol may be repeated three times, and two symbols may be repeated twice.

Figure 3D:
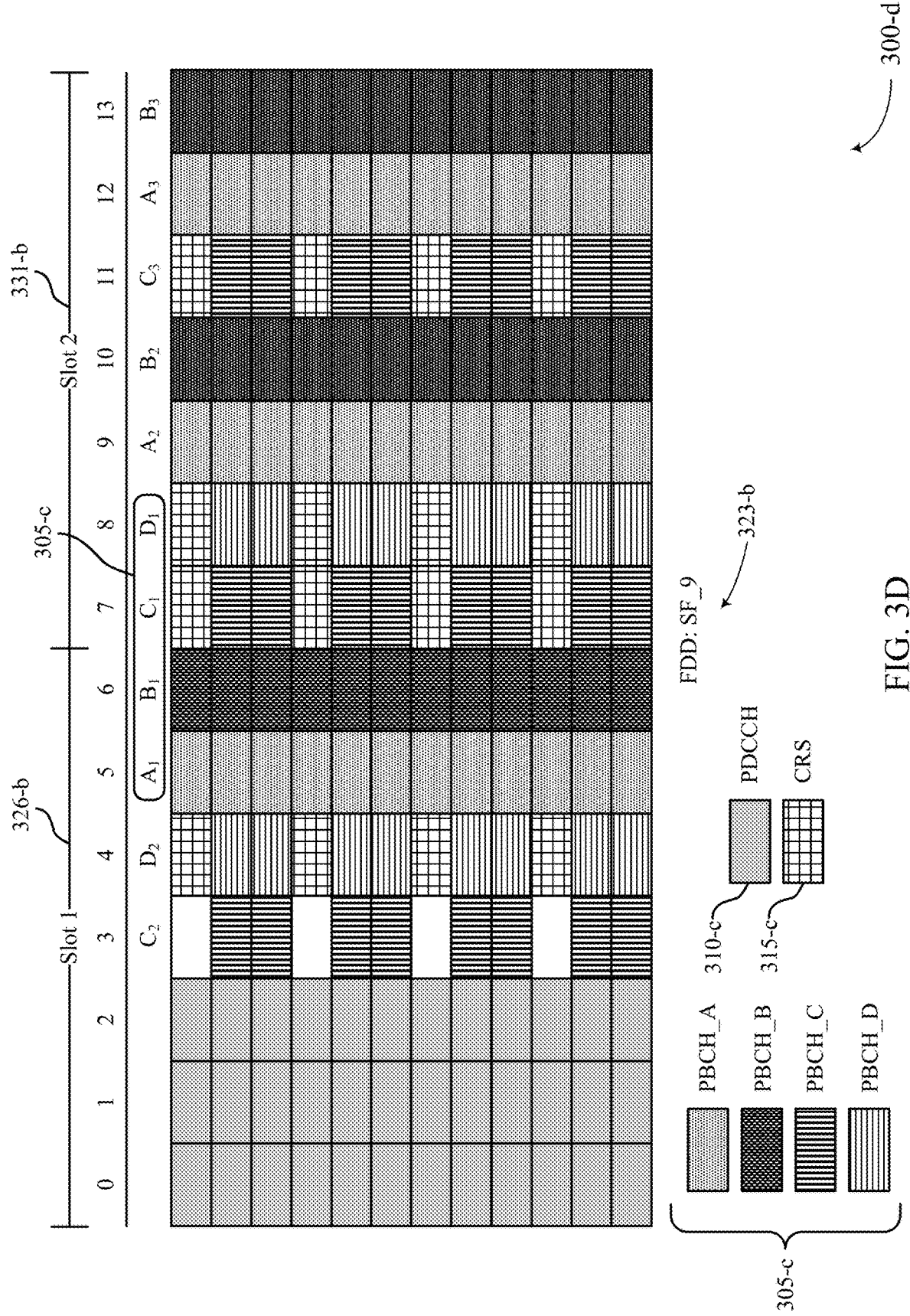

In another alternative mapping, shown in FIG. 3D, the PBCH symbols 305 may include four consecutive OFDM symbols $A_1$, $B_1$, $C_1$, $D_1$, where the first OFDM symbol $A_1$ is located at the fifth symbol period of the first slot (e.g., symbol period 5). The first and second OFDM symbols $A_1$ and $B_1$ may use the full frequency allocation (e.g., 12 subcarriers), while the third and fourth OFDM symbols may be multiplexed with CRS 315-c. The base station 105 may then determine which OFDM symbol repetitions to map to the remaining symbol periods. For instance, as shown by FDD repetition 300-d, the base station 105 may map the OFDM symbol repetitions so that three of the OFDM symbols A, B, and C are repeated three times and so that one of the OFDM symbol D is repeated twice. This may result in a subframe that includes This may result in a subframe that includes resource elements (i.e., a subcarrier within a symbol period) without a mapping of a channel or signal (e.g., PBCH), such as in symbol period 3.

Figure 3E:
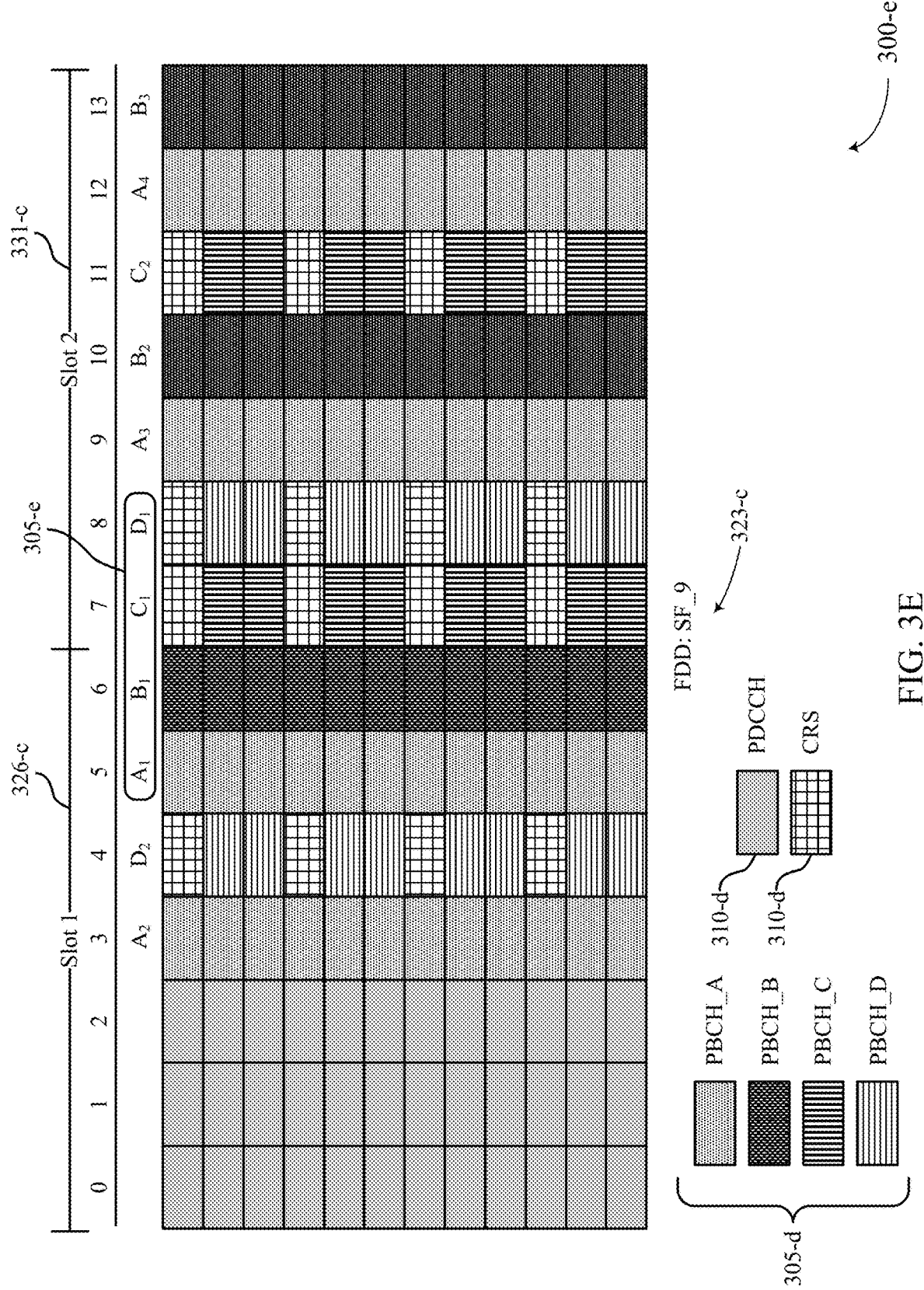

Alternatively, as shown in FIG. 3E, one OFDM symbol A may be repeated four times, one OFDM symbol B may be repeated three times, and two OFDM symbols C and D may be repeated twice. In this way, all of the resources within the second subframe 323-c may be utilized.

Figure 4A:
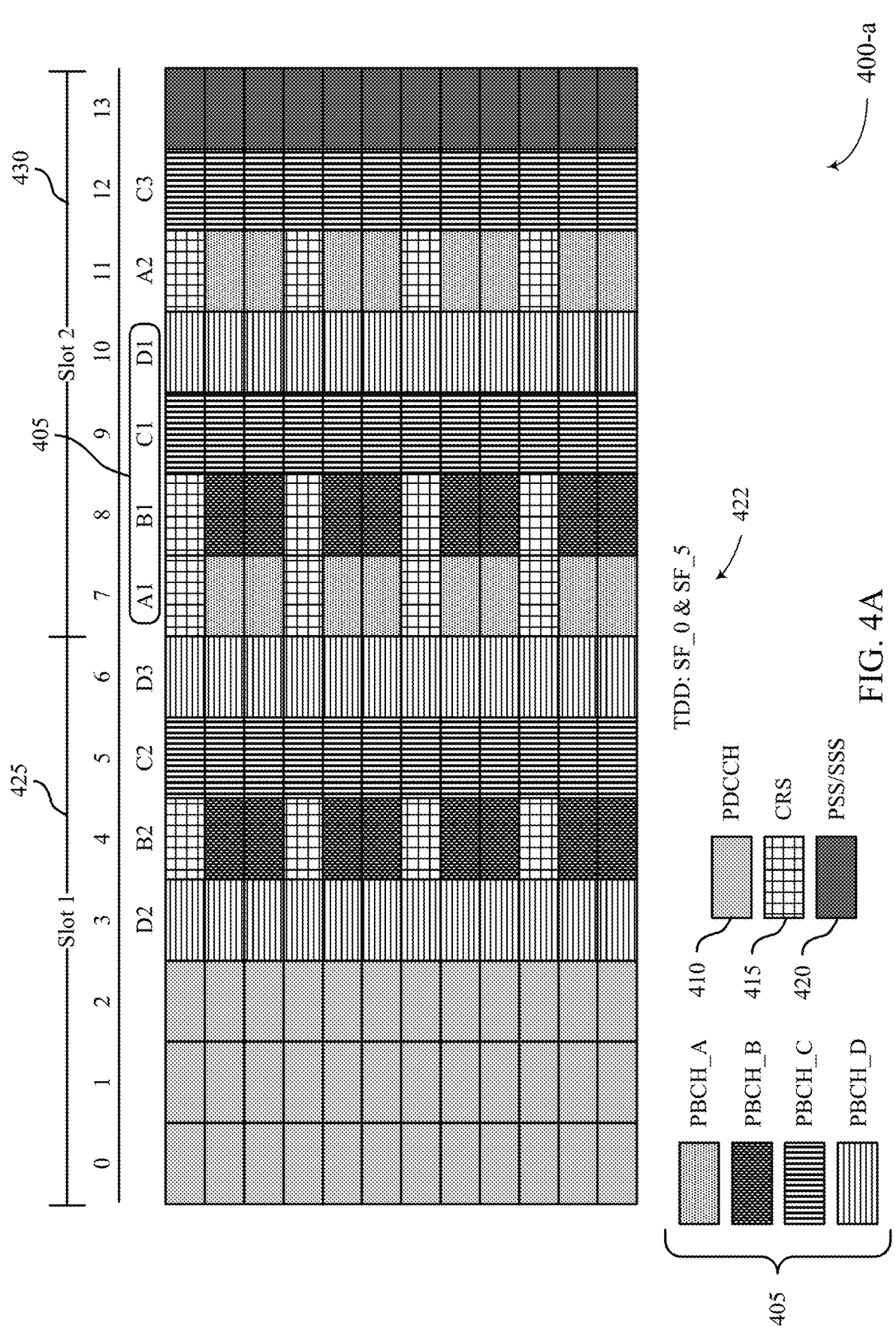
FIGS. 4A-4B illustrate examples of TDD repetition patterns for PBCH repetition for EMTC in accordance with various aspects of the present disclosure.
Figure 4B:
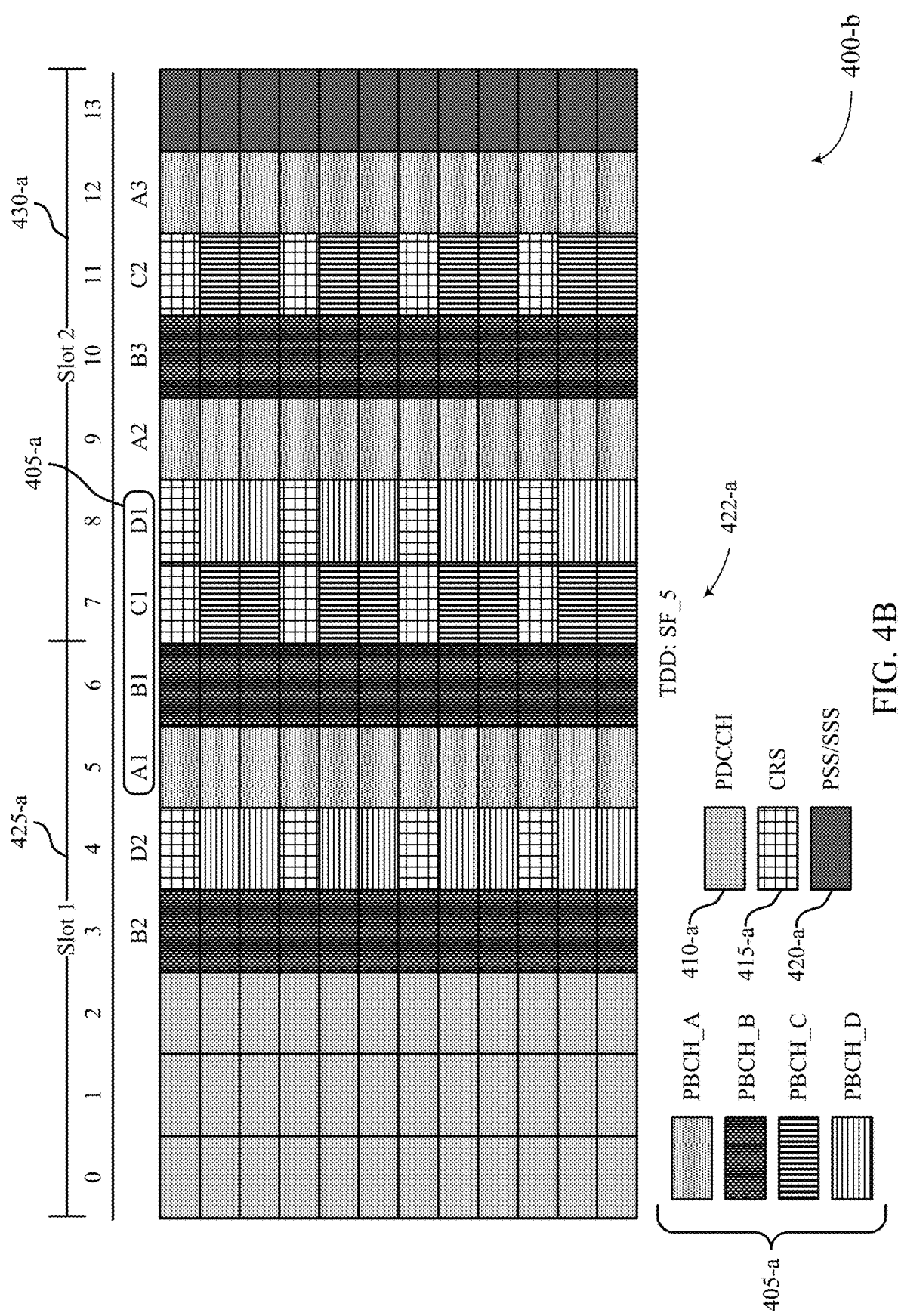

FIGS. 4A-4B illustrate examples of TDD repetition patterns 400 for PBCH repetition in accordance with various aspects of the present disclosure. TDD repetition patterns 400 may illustrate aspects of a transmission between a UE 115 and a base station 105, as described above with reference to FIGS. 1-2. TDD repetition patterns 400 may include PDCCH 410 transmissions, CRS 415, PSS/SSS 420, PBCH symbols 405 (A to D), which may be repeated within the subframe 422. Subframe 422 may include a first slot 425 and a second slot 430.

In FIG. 4A, a base station 105 may identify PBCH symbols 405 in a first subframe 422 (e.g., SF0) of a TDD radio frame. PBCH symbols 405 may include four consecutive OFDM symbols $A_1$, $B_1$, $C_1$, $D_1$, where the first OFDM symbol $A_1$ may be located at the first symbol period of the second slot (e.g., symbol period 7). The first and second OFDM symbols $A_1$ and $B_1$ may be multiplexed with CRS 415, while the third and fourth OFDM symbols $C_1$ and $D_1$ may use the full frequency allocation (e.g., 12 subcarriers).

Symbol periods 0-3 may be occupied by the PDCCH 410, and symbol period 13 may be occupied by PSS/SSS 420.

The base station 105 may then identify unused resources (e.g., resources in symbol periods 3-6, 11, and 12) and distribute the OFDM symbol repetitions over the available resources. Base station 105 may determine that OFDM symbols that are multiplexed with CRS 415, such as $A_1$ and $B_1$, may be mapped to a symbol period that also includes CRS 415 (e.g., symbol periods 4 and 11). Base station 105 may similarly determine that OFDM symbols that utilize the full frequency allocation, such as $C_1$ and $D_1$, may be mapped to symbol periods that do not include CRS 415 (e.g., symbol period 3, 4, 12, and 13). For example, as shown in TDD repetition pattern 400-$a$, base station 105 may map OFDM symbol repetition $A_2$ to symbol period 11, OFDM symbol repetition $B_2$ to symbol period 4, OFDM symbol repetitions $C_2$ and $C_3$ to symbol periods 5 and 12, respectively, and OFDM symbol repetition $D_2$ to symbol periods 3 and 6. Multiple different mappings may be realized that satisfy the criteria that an OFDM symbol multiplexed with CRS 415 may be mapped to a symbol period that includes CRS 415. The TDD repetition pattern 400-$a$ may be used for both the first subframe (e.g., SF0) and a second subframe (e.g., SF5) that occur within a TDD radio frame. In this way, a UE 115 may correlate the two subframes to determine if PBCH repetition is being used.

Alternatively, in FIG. 4B, the PBCH symbols 405 may include four consecutive OFDM symbols $A_1$, $B_1$, $C_1$, $D_1$, where the first OFDM symbol $A_1$ is located at the fifth symbol period of the first slot 425 (e.g., symbol period 5). The first and second OFDM symbols $A_1$ and $B_1$ may use the full frequency allocation (e.g., 12 subcarriers), while the third and fourth OFDM symbols may be multiplexed with CRS 415-$a$. The base station 105 may then determine which OFDM symbol repetitions to map to the remaining symbol periods. For instance, as shown by TDD repetition pattern 400-$b$, the base station 105 may map the OFDM symbol repetitions so that each symbol is repeated an equal number of times over the first and second subframes. For instance, in TDD repetition pattern 400-$a$, A and B may be repeated twice, while C and D may be repeated three times. In TDD repetition pattern 400-$b$, A and B may be repeated three times, while C and D may be repeated twice, resulting in five repetitions of each OFDM symbol.

A base station 105 may introduce randomization to the repetition patterns 300 and 400 to prevent structured interference problems. For instance, a base station 105 may introduce a degree of randomization between the repetitions by rotating the modulation symbol transmitted in symbol period i and tone j by quasi-random phase $\theta_{i,j}$. The quasi-random phase $\theta_{i,j}$ may be determined based at least in part on the primary cell identifier. The base station 105 may also randomize the mapping of the PBCH repetitions based at least in part on the primary cell identifier. For instance, a first mapping, FDD: SF9, for a first base station 105 may be {C, D, A, B, C, D, A, B, C, A, B} and a second mapping for a second base station 105 may be {D, C, A, B, C, D, A, B, C, B, A}.

A UE 115 may receive the first and second subframe from the base station 105 and de-rotate the repeated symbols. The UE 115 may use the received PBCH and PBCH repetitions for frequency tracking, such as in a frequency tracking loop (FTL). For instance, a received signal that excludes CRS tones may be denoted as s [i,j], where i is time and j is frequency; and $\Omega_k=\{[a_1, a_2], [b_1, b_2]\}$ may be a pair of repeated symbols separated by K OFDM symbols. For example, as shown in FIG. 3D, $\Omega_4=\{[3,7], [4,8], [5,9], [6,10], [7,11]\}$. The correlation may be obtained as:

$$C_k = \Sigma_{\alpha \in \Omega_k} \Sigma_j e^{i\theta_{\alpha 0, j}} e^{-i\theta_{\alpha 1, j}} s^*[\alpha_0, j] s[\alpha_1, j].$$

The frequency estimation may then be obtained as a weighted average with weights, $w_k$, as:

$$\hat{f} = \sum_k w_k < C_k.$$

The UE 115 may combine the frequency estimation derived from the repetitions with the frequency estimations determined from the CRS.

The UE 115 may additionally determine whether the PBCH is repeated based at least in part on the repetitions. The following equations:

$$T_\alpha = \frac{|s^H[\alpha_0] \Theta s[\alpha_1, j]|^2}{|s^H[\alpha_0]|^2 |s[\alpha_0]|^2}$$

and $$T = \sum_k \sum_{\alpha \in \Omega_k} T_\alpha < \gamma \text{ for } H_0$$

$$T = \sum_k \sum_{\alpha \in \Omega_k} T_\alpha > \gamma \text{ or } H_1$$

may be used to determine that for $H_0$ no PBCH repetition is used, and that for $H_1$ PBCH repetition is used. $H_0$ and $H_1$ may correspond to different channel measurements taken by UE 115. The UE 115 may then determine whether or not to enable a PBCH-based tracking loop based at least in part on determining if PBCH repetition is used.

Figure 5:
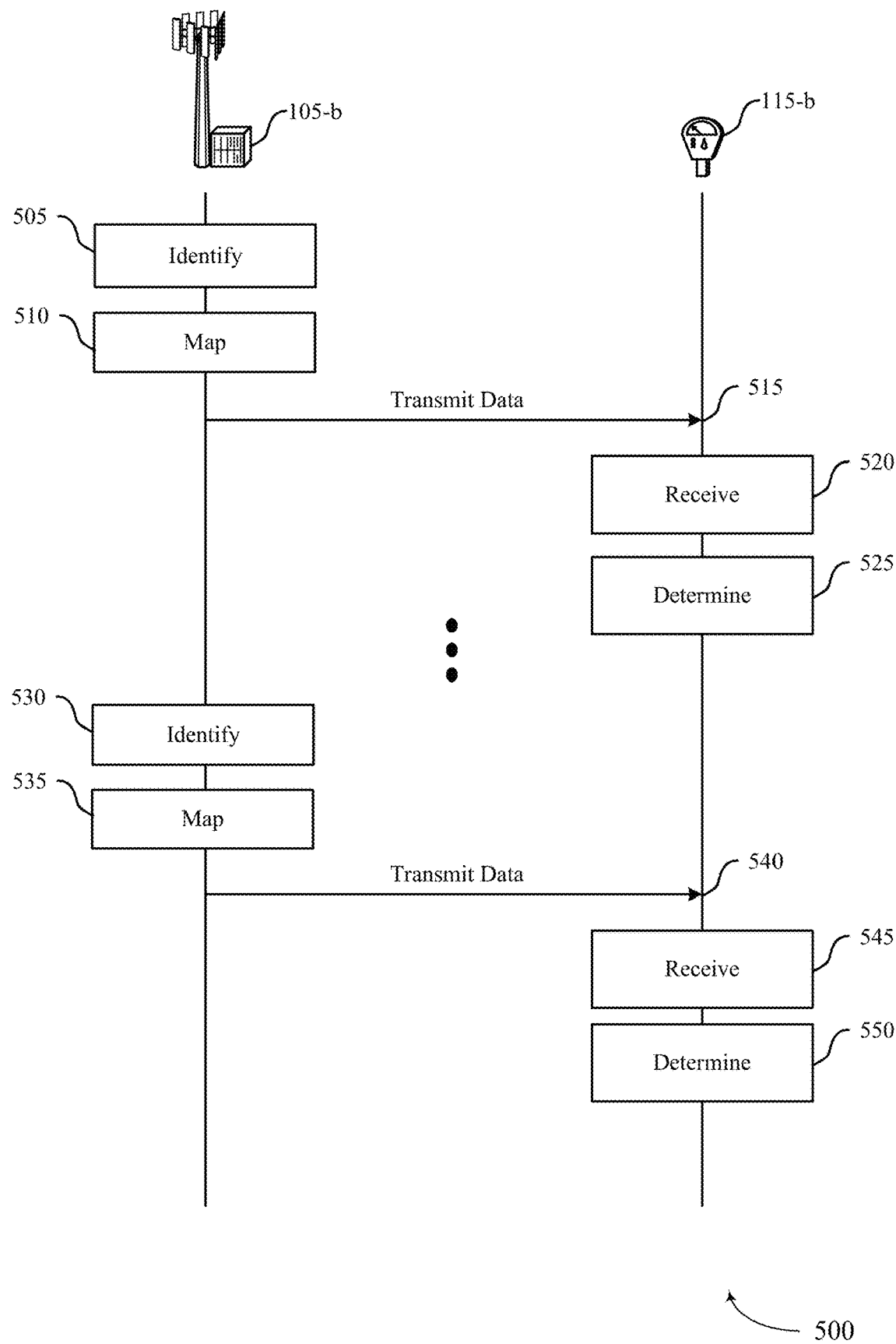
FIG. 5 illustrates an example of a process flow that supports PBCH repetition for EMTC in accordance with various aspects of the present disclosure.

FIG. 5 illustrates an example of a process flow 500 for PBCH repetition for EMTC in accordance with various aspects of the present disclosure. Process flow 500 may be performed by UE 115-$b$ and base station 105-$b$, which may be examples of a UE 115 and base station 105 described above with reference to FIGS. 1-2. In some examples, base station 105-$b$ may map PBCH repetitions to a first subframe and transmit the subframe to UE 115-$b$. In the same radio frame, base station 105-$b$ may map PBCH repetitions to a second subframe and transmit the subframe to UE 115-$b$. UE 115-$b$ may use the repetitions within each subframe and the first and second transmissions to decode the PBCH and determine frequency information.

At step 505, base station 105-$b$ may identify a PBCH and a CRS pattern associated with a first subframe. In some cases, base station 105-$b$ may identify that a PBCH is scheduled to be transmitted during the first subframe based at least in part on network scheduling. The PBCH may be located in the first four symbol periods of the second slot, for instance. The CRS pattern may include 16 CRS resource elements. In some examples, the first subframe is subframe 0 (SF0) of the TDD frame and the second subframe is subframe 5 (SF5) of the TDD frame. In other cases, base station 105-$b$ may identify the resource mapping to the subframe which includes PBCH, CRS resources, PDCCH, or PSS/SSS. Base station 105-$b$ may additionally identify available resources within the subframe. In some examples, identifying the PBCH in the first subframe includes identifying a first set of symbols that may include portions of the PBCH and CRS. For instance, base station 105-$b$ may identify a PBCH symbol that is multiplexed with CRS. Base station 105-*b* may also identify a second set of symbols including portions of the PBCH without the CRS. For instance, base station 105-*b* may identify a PBCH symbol or portion of the PBCH that is not multiplexed with CRS and uses the full frequency allocation.

At step 510, base station 105-*b* may map a repetition of portions of the PBCH to other symbol periods within the first subframe. In one example, base station 105-*b* may map a symbol period that includes CRS and is associated with the first subframe. Base station 105-*b* may identify a first symbol period, including CRS, of the first subframe that is available for PBCH repetition and may repeat at least one symbol of the first set of symbols during the first symbol period. For instance, base station 105-*b* may map a repetition of a PBCH symbol that is multiplexed with CRS to a symbol period that has available resources and also includes CRS. In other cases, base station 105-*b* may identify a second symbol period that is available for PBCH repetition, the second symbol period excluding CRS. Base station 105-*b* may then map a repetition of a portion of the PBCH that does not include CRS to the second symbol period.

In some cases, base station 105-*b* may map a repetition of a portion of the PBCH that includes CRS to a symbol period of the second subframe without the CRS. This mapping may result in null tones or resource elements (i.e., unused frequency resources, such as a subcarrier during a symbol period). In some examples, base station maps repetitions of the PBCH based at least in part on a cell identification (ID). For instance, each base station may determine different mappings of the PBCH repetitions based at least in part on an assigned cell ID. Accordingly, a base station may determine which available symbol periods correspond to which PBCH repetitions. In some cases, the mapping is randomized to prevent inter-cell interference. In some cases, the base station 105-*b* may encode the PBCH with a cyclic code using a Radio Network Temporary Identifier (RNTI) assigned to the UE 115-*b* so that the UE 115-*b* knows that the PBCH is to be used by the UE 115-*b*.

At step 515, base station 105-*b* may transmit the first subframe along with PBCH based at least in part on the mapping. Prior to transmitting the first subframe, base station 105-*b* may introduce randomization to the repetitions. For instance, may rotate each repeated portion of the PBCH by a phase based at least in part on a subcarrier index, a slot index, a cell identification, or a symbol index. In some examples the frame may be a time division duplex (TDD) frame. Base station 105-*b* may randomize the phase rotation introduced to the repetitions to prevent interference from nearby cells. In some examples, the base station 105-*b* may encode the PBCH (and one or more of its repetitions) using a cyclic code prior to transmission to the UE 115-*b*.

At step 520, the UE 115-*b* may receive the PBCH in a subframe, such that a symbol period of the subframe includes a CRS and a repetition of a portion of the PBCH. For example, the UE 115-*b* may receive a radio wave and recover bits from the radio wave using a demodulator. In an example, the UE 115-*b* may calculate a log likelihood ratio (LLR) of the recovered bits to generate soft bits that are input into a decoder. The decoder may decode the soft bits and output a decoded bit stream of a subframe that includes the PBCH. The decoder may also map bits of the decoded bit stream to one or more OFDM symbols.

At step 525, UE 115-*b* may determine that the first subframe includes repetitions of portions of the PBCH. UE 115-*b* may identify a signal in a symbol available for PBCH and determine that the symbol available for PBCH includes a repeated portion of the PBCH based at least in part on the identified signal. In some cases, UE 115-*b* may determine a repetition pattern of portions of PBCH based at least in part on a cell identification (ID). In other cases, the UE 115-*b* may determine the first subframe includes repetitions of portions of the PBCH through correlation techniques. Determining a repetition pattern, in some examples, includes determining that a subframe does not include any PBCH repetitions. In some cases, the UE 115-*b* may not be provided with the location of the PBCH or any of its repetitions within a subframe and may perform a blind search for the PBCH within the subframe. For example, the UE 115-*b* may use the determined repetition pattern to identify a set of candidate locations for the PBCH (or any of its repetitions) within the received subframe. To do so, the UE 115-*b* may identify bits of the decoded bit stream at one of the candidate locations and perform a check cyclic redundancy check (CRC) on the identified bits at the candidate location (e.g., performs CRC on bits of entire candidate PBCH at candidate location). If a CRC error is found at a particular one of the candidate locations, the UE 115-*b* may identify bits of the decoded bit stream at a next one of the candidate locations or determine that all candidate locations have a CRC error. If a CRC error is not found for the identified bits at one of the candidate locations, the UE 115-*b* may determine that PBCH in the subframe has been successfully detected and use the identified bits as the PBCH for the subframe. Once a CRC error is not identified for one of the candidate locations of the set, the UE 115-*b* may, but does not need to, check the remaining candidate locations. In some examples, UE 115-*b* may de-rotate symbols including repeated portions of the PBCH by a phase based at least in part on a subcarrier index, a slot index, or a symbol index. UE 115-*b* may use the repetitions to estimate a frequency. In some examples the frequency estimation is based at least in part on the CRS.

At step 530, may identify a CRS pattern of a second subframe of the frame. In some examples the frame is a frequency division duplex (FDD) frame. In some examples the first subframe is subframe 0 (SF0) of the FDD frame and the second subframe is subframe 9 (SF9) of the FDD frame. In some examples, the first and second subframes each include the same CRS pattern.

At step 535, base station 105-*b* may map the same PBCH associated with the first subframe to the second subframe. In some cases, the PBCH is mapped to the first four symbol periods of the second slot. In other cases, the PBCH is mapped PBCH is mapped to different sets of symbol periods in each of the first and second subframes. For instance, the PBCH is mapped beginning from the fifth symbol period of the first slot. Base station 105-*b* may identify portions of the PBCH for repetitive mapping within the second frame. In some cases, the PBCH is mapped so that each portion of the PBCH is repeated an equal number of times across the first and second subframes. Base station 105-*b* may map repetitions of the portion of the PBCH similar to the mapping described above for the first subframe. For instance, base station 105-*b* may map a portion that includes CRS to a symbol period of the second subframe that also includes CRS. In some cases, the second subframe includes more symbol periods that are available for repetitive mapping. For instance, in FDD, the second subframe may not include PSS/SSS.

At step 540, base station 105-*b* may transmit the second subframe along with PBCH based at least in part on the mapping. Transmitting the second subframe may include aspects of transmitting the first subframe as described in step 515. In some examples, the CRS patterns of the first and second subframes each includes a same CRS pattern and the portion of the PBCH is mapped to corresponding sets of symbol periods in the first and second subframes. Although illustrated at distinct steps (i.e., 515 and 540), base station 105-*b* may transmit within a single 10 ms radio frame several subframes that have PBCH repetitions. For example, SF0 and SF5 of a TDD frame or SF0 and SF9 of an FDD frame may include PBCH repetitions as described herein.

At steps 545 and 550, UE 115-*b* may receive and decode the second subframe and determine additional frequency estimates similar to steps 520 and 525. UE 115-*b* may additionally use the PBCH received in the second subframe to supplement the PBCH received in the first subframe. This may increase the likelihood that UE 115-*b* successfully decodes the PBCH. As mentioned, several subframes of a frame may include PBCH repetitions, so while illustrated at distinct steps (i.e., 525 and 550), a UE 115-*b* may determine that PBCH is repeated and may decode PBCH based at least in part on receive a subframe with the multiple repetitions.

Figure 6:
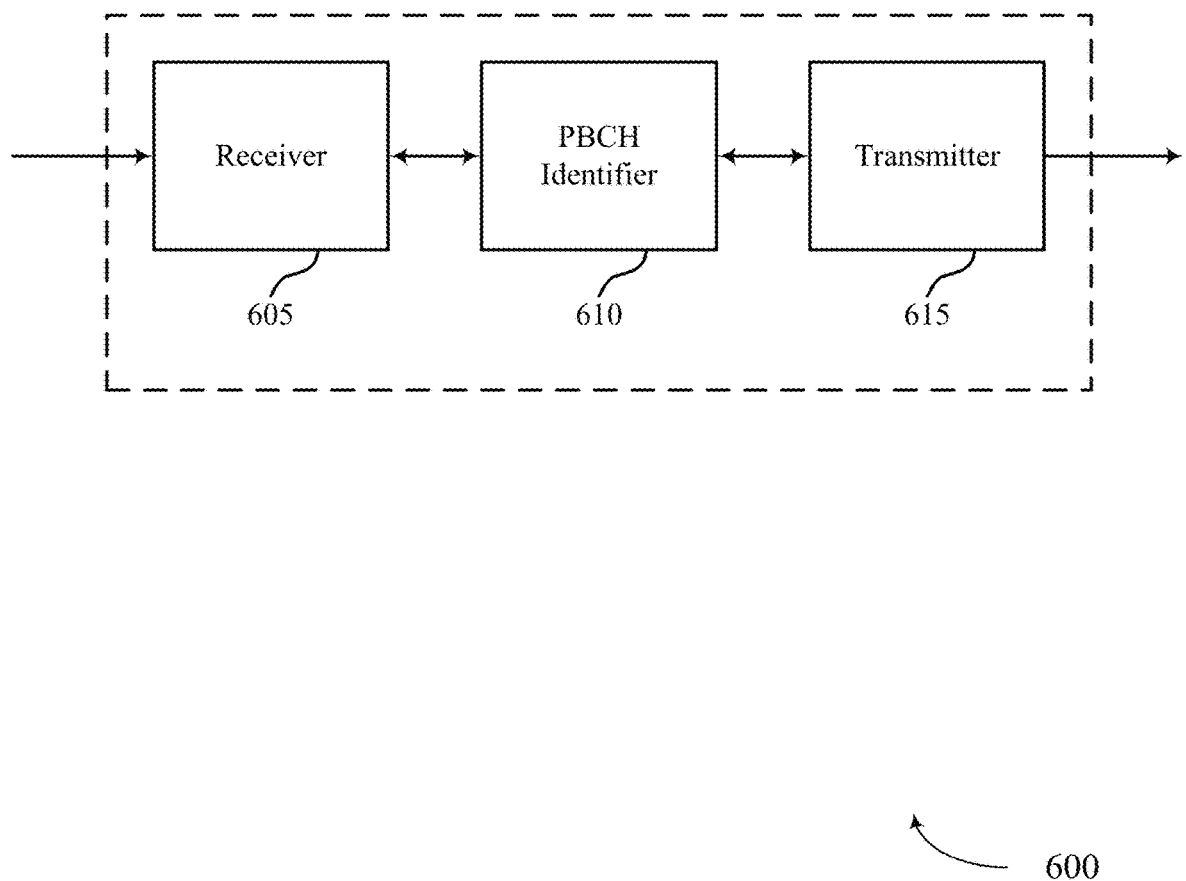
FIGS. 6-8 show block diagrams of a wireless device that supports PBCH repetition for EMTC in accordance with various aspects of the present disclosure.

FIG. 6 shows a block diagram of a wireless device 600 that supports PBCH repetition for EMTC in accordance with various aspects of the present disclosure. Wireless device 600 may be an example of aspects of a UE 115 described with reference to FIGS. 1-5. Wireless device 600 may include a receiver 605, a PBCH identifier 610, or a transmitter 615. Wireless device 600 may also include a processor. Each of these components may be in communication with one another.

The receiver 605 may receive information such as packets, user data, or control information associated with various information channels (e.g., control channels, data channels, and information related to PBCH repetition, etc.). Information may be passed on to the PBCH identifier 610, and to other components of wireless device 600. In some examples, the receiver 1005 may receive a PBCH in a subframe, some of the symbol periods of the subframe may include a CRS and a repetition of a portion of the PBCH. In some examples, receiving the PBCH in the subframe includes receiving the repetition of a portion of the PBCH in the subframe.

The PBCH identifier 610 may receive a PBCH in a subframe, and one or several symbol periods of the subframe may include a CRS and a repetition of a portion of the PBCH, and decode the PBCH.

The transmitter 615 may transmit signals received from other components of wireless device 600. In some examples, the transmitter 615 may be collocated with the receiver 605 in a transceiver module. The transmitter 615 may include a single antenna, or it may include a plurality of antennas.

Figure 7:
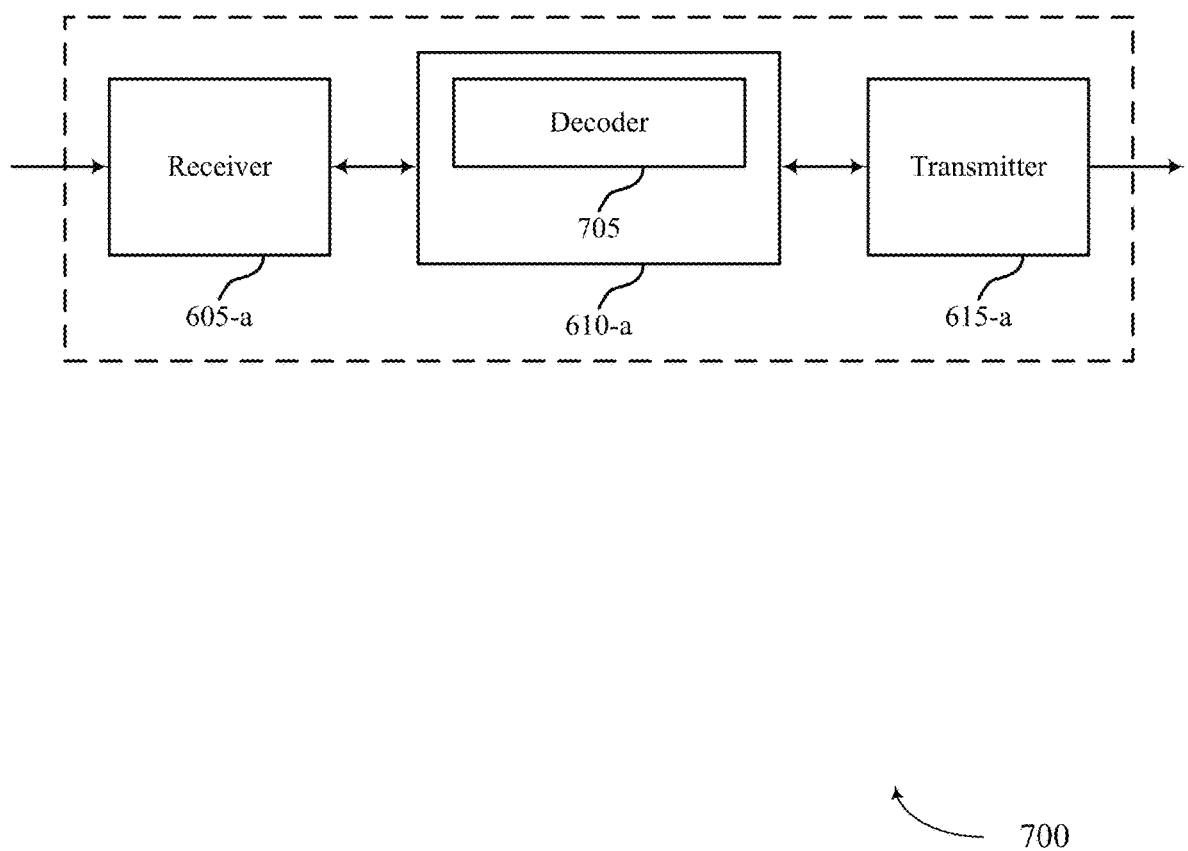

FIG. 7 shows a block diagram of a wireless device 700 that supports PBCH repetition for EMTC in accordance with various aspects of the present disclosure. Wireless device 700 may be an example of aspects of a wireless device 600 or a UE 115 described with reference to FIGS. 1-6. Wireless device 700 may include a receiver 605-*a*, a PBCH identifier 610-*a*, or a transmitter 615-*a*. Wireless device 700 may also include a processor. Each of these components may be in communication with one another. The PBCH identifier 610-*a* may also include a decoder 705.

The receiver 605-*a* may receive information which may be passed on to PBCH identifier 610-*a*, and to other components of wireless device 700. The PBCH identifier 610-*a* may perform the operations described with reference to FIG. 6. The transmitter 615-*a* may transmit signals received from other components of wireless device 700.

The decoder 705 may decode the PBCH as described with reference to FIGS. 2-5. The decoder 705 may also blindly detect the PBCH.

Figure 8:
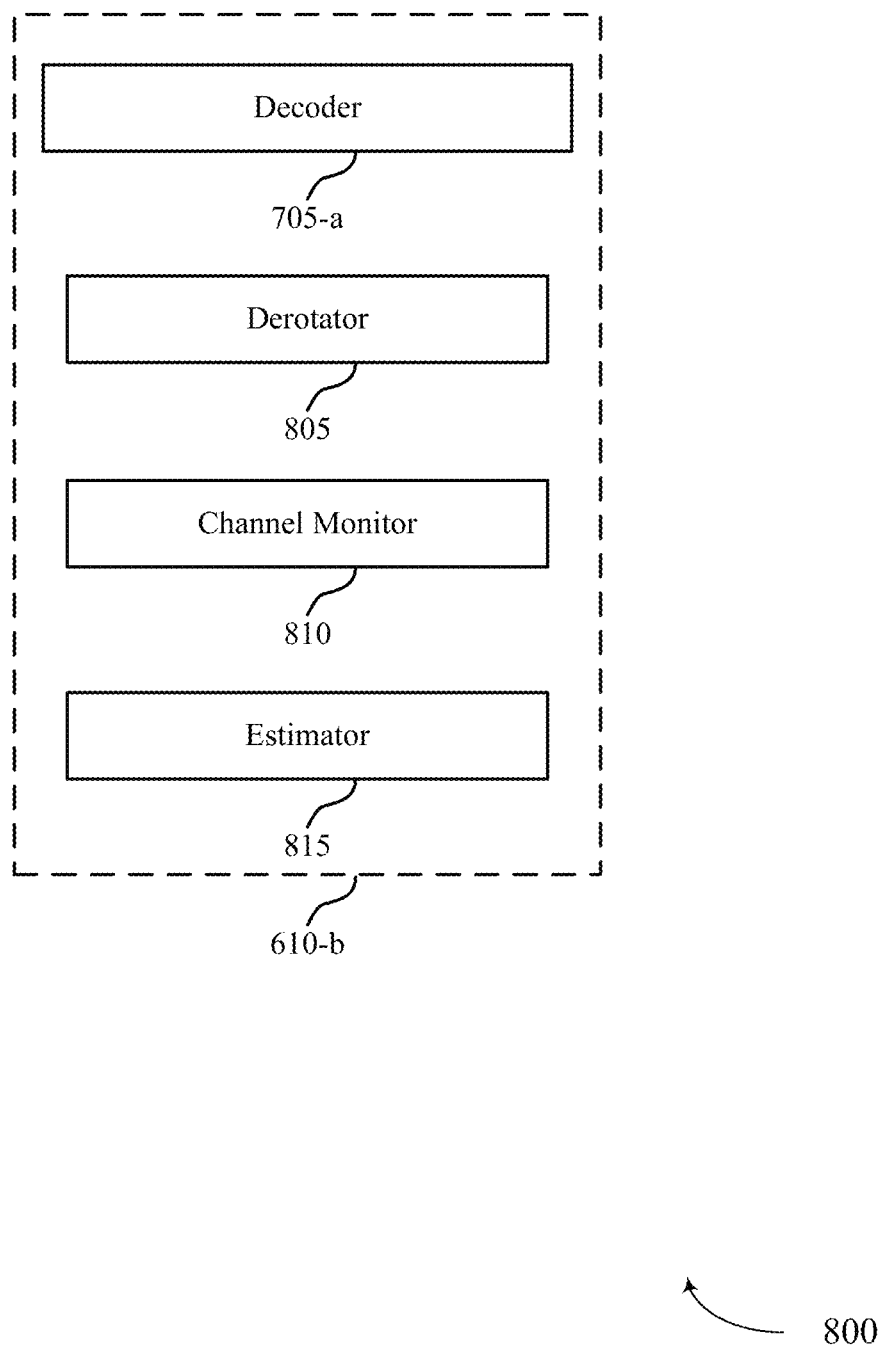

FIG. 8 shows a block diagram 800 of a PBCH identifier 610-*b* which may be a component of a wireless device 600 or a wireless device 700 that supports PBCH repetition for EMTC in accordance with various aspects of the present disclosure. The PBCH identifier 610-*b* may be an example of aspects of a PBCH identifier 610 described with reference to FIGS. 6-7. The PBCH identifier 610-*b* may include a decoder 705-*a*, a de-rotator 805, a channel monitor 810, and an estimator 815. Each of these modules may perform the functions described with reference to FIG. 7.

The decoder 705-*a* may decode the PBCH as described with reference to FIGS. 2-5. The decoder 705 may also blindly detect the PBCH.

The de-rotator 805 may de-rotate symbols that include repeated portions of the PBCH by a phase based at least in part on a cell identification, a subcarrier index, a slot index, or a symbol index as described with reference to FIGS. 2-5.

The channel monitor 810 may determine a repetition pattern of portions of PBCH based at least in part on a cell identification (ID) as described with reference to FIGS. 2-5. The channel monitor 810 may also identify a signal in a symbol available for PBCH. The channel monitor 810 may also determine that the symbol available for PBCH has a repeated portion of the PBCH, the determination may be based at least in part on the identified signal.

The estimator 815 may estimate a frequency using the repeated portion of the PBCH as described with reference to FIGS. 2-5. In some examples, the frequency estimation may be based at least in part on the CRS.

Figure 9:
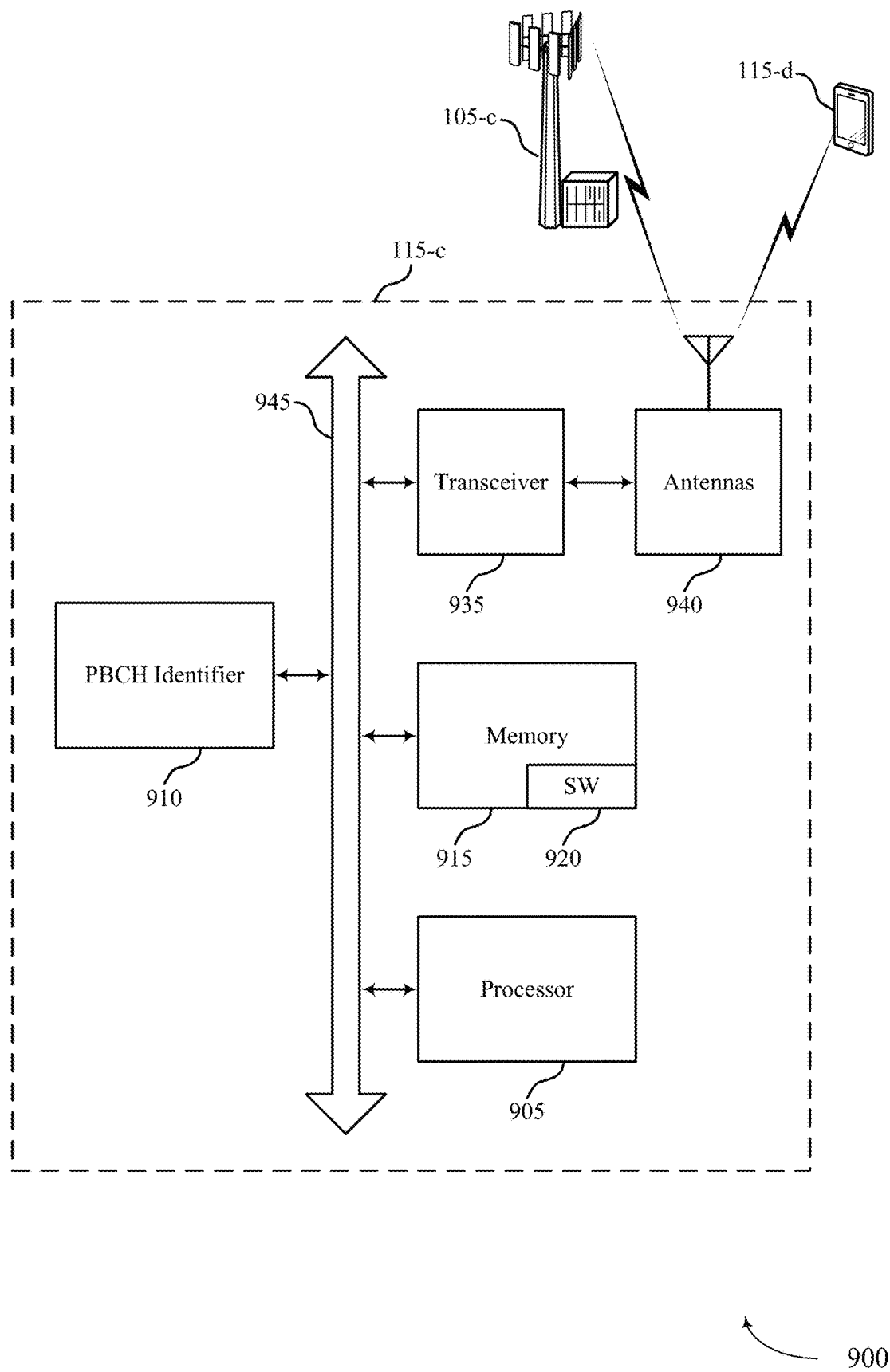
FIG. 9 illustrates a block diagram of a system including a user equipment (UE) that supports PBCH repetition for EMTC in accordance with various aspects of the present disclosure.

FIG. 9 shows a diagram of a system 900, including a UE 115, that supports PBCH repetition for EMTC in accordance with various aspects of the present disclosure. System 900 may include UE 115-*c*, which may be an example of a wireless device 600, a wireless device 700, or a UE 115 described with reference to FIGS. 1, 2 and 6-8. UE 115-*c* may include a PBCH identifier 910, which may be an example of a PBCH identifier 610 described with reference to FIGS. 6-8. UE 115-*c* may also include components for bi-directional voice and data communications including components for transmitting communications and components for receiving communications. For example, UE 115-*c* may communicate bi-directionally with UE 115-*d* or base station 105-*c*.

UE 115-*c* may also include a processor 905, and memory 915 (including software (SW) 920), a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*c* may include a single antenna 940, UE 115-*c* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., PBCH repetition, etc.). Alternatively, the software/firmware code 920 may not be directly executable by the processor 905 but cause a computer (e.g., when compiled and executed) to perform functions described herein. The processor 905 may include an intelligent hardware device (e.g., a central processing unit (CPU), a microcontroller, an application specific integrated circuit (ASIC), etc.)

Figure 10:
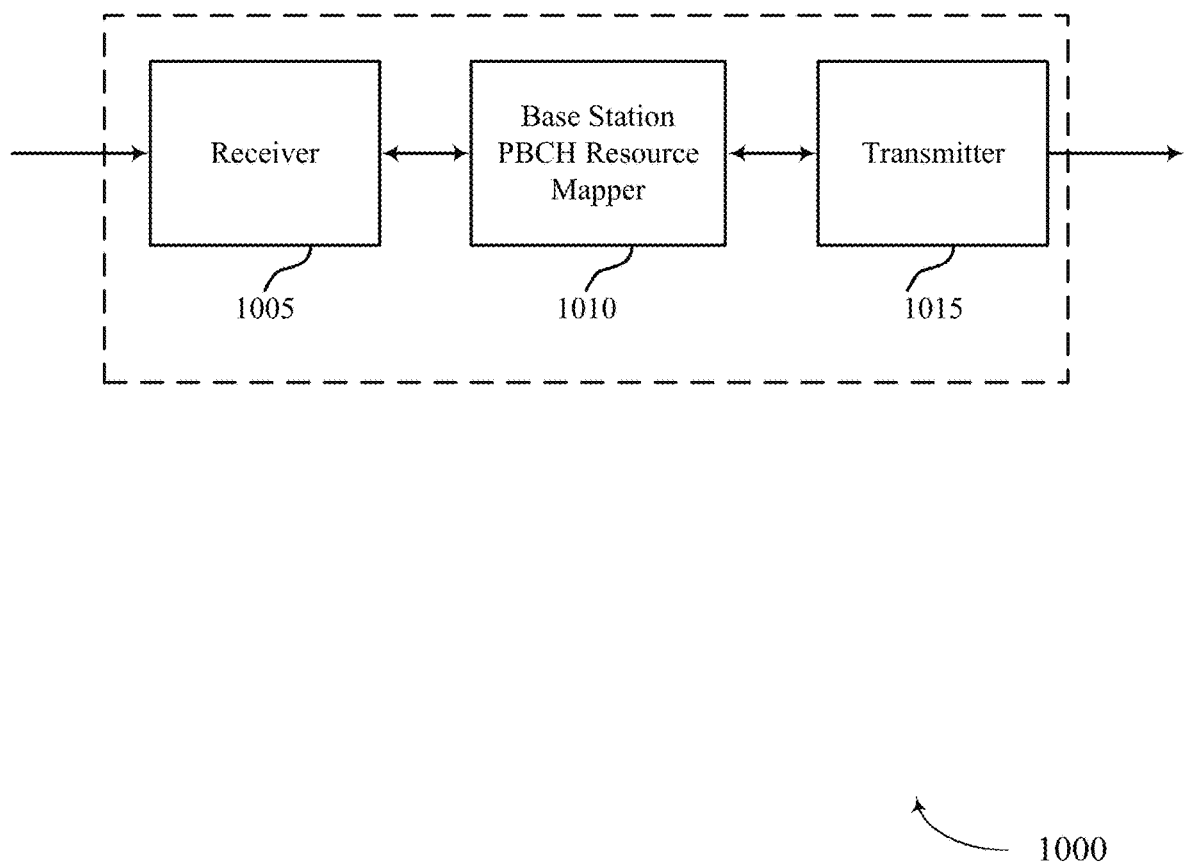
FIGS. 10-12 show block diagrams of a wireless device that supports PBCH repetition for EMTC in accordance with various aspects of the present disclosure.

FIG. 10 shows a block diagram of a wireless device 1000 that supports PBCH repetition in accordance with various aspects of the present disclosure. Wireless device 1000 may be an example of aspects of a base station 105 described with reference to FIGS. 1-9. Wireless device 1000 may include a receiver 1005, a base station PBCH resource mapper 1010, and a transmitter 1015. Wireless device 1000 may also include a processor. Each of these components may be in communication with one another.

The receiver 1005 may receive information such as packets, user data, or control information associated with various information channels (e.g., control channels, data channels, and information related to PBCH repetition, etc.). Information may be passed on to the base station PBCH resource mapper 1010, and to other components of wireless device 1000.

The base station PBCH resource mapper 1010 may identify a PBCH in a first subframe of a frame, identify a CRS pattern of the first subframe, map a first repetition of a portion of the PBCH to a symbol period of the first subframe—the symbol period may include CRS—and transmit the first subframe.

The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas. In some examples, the transmitter 1015 may transmit the first subframe. In some examples, the transmitter 1015 may transmit the second subframe.

Figure 11:
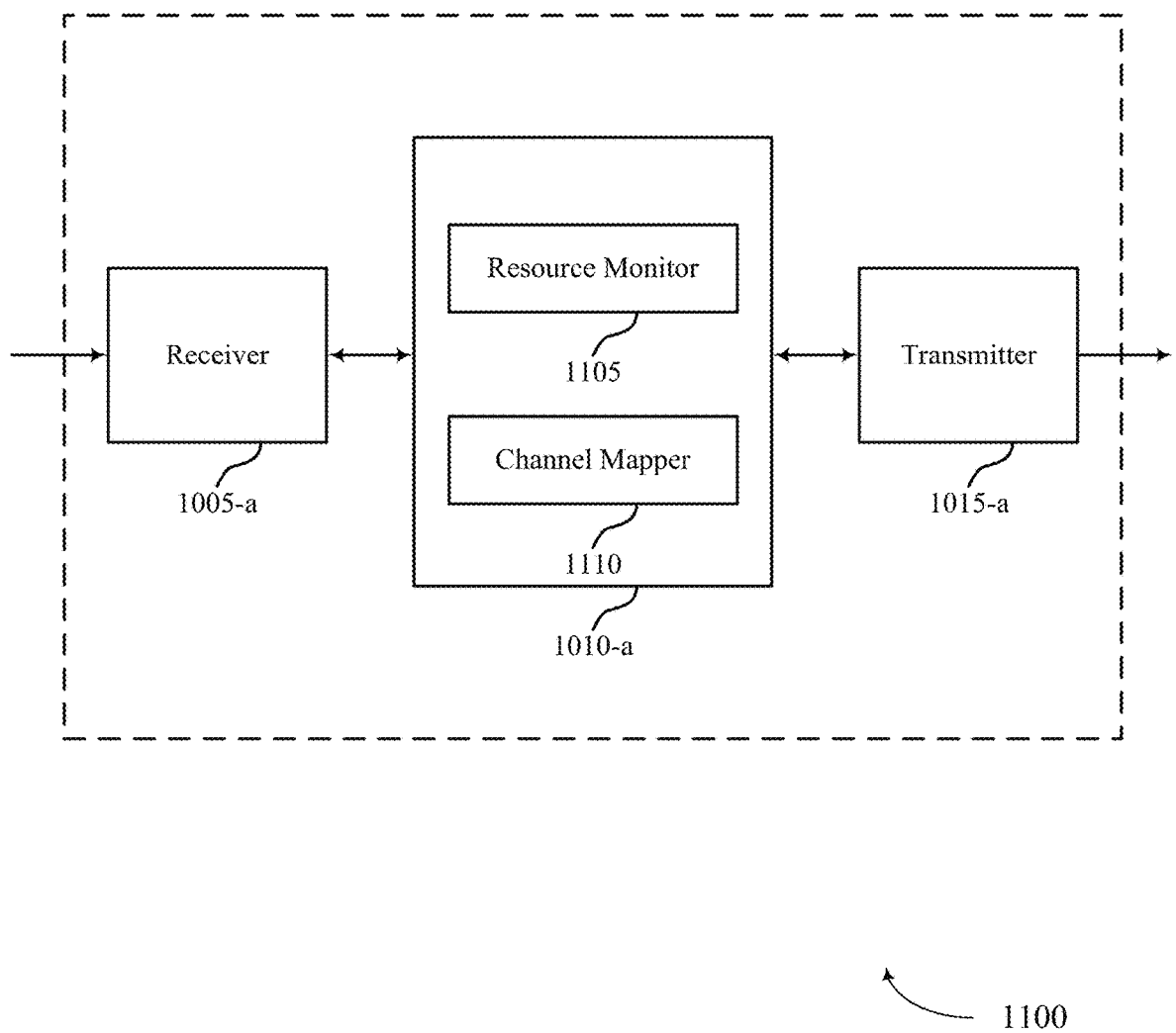

FIG. 11 shows a block diagram of a wireless device 1100 for PBCH repetition for EMTC in accordance with various aspects of the present disclosure. Wireless device 1100 may be an example of aspects of a wireless device 1000 or a base station 105 described with reference to FIGS. 1-10. Wireless device 1100 may include a receiver 1005-a, a base station PBCH resource mapper 1010-a, and a transmitter 1015-a. Wireless device 1100 may also include a processor. Each of these components may be in communication with one another. The base station PBCH resource mapper 1010-a may also include a resource monitor 1105, and a channel mapper 1110.

The receiver 1005-a may receive information which may be passed on to base station PBCH resource mapper 1010-a, and to other components of wireless device 1100. The base station PBCH resource mapper 1010-a may perform the operations described with reference to FIG. 10. The transmitter 1015-a may transmit signals received from other components of wireless device 1100.

The resource monitor 1105 may identify a PBCH in a first subframe of a frame as described with reference to FIGS. 2-5. The resource monitor 1105 may also identify a CRS pattern of the first subframe. In some examples, the identifying the PBCH in the first subframe includes identifying a first set of symbols that have portions of the PBCH and CRS. The resource monitor 1105 may also identify a second set of symbols that have portions of the PBCH without the CRS. The resource monitor 1105 may also identify a second symbol period that is available for PBCH repetition, the second symbol period excluding CRS. The resource monitor 1105 may also identify a CRS pattern of a second subframe of the frame. In some examples, the frame is a TDD frame.

In some examples, the first subframe is subframe 0 (SF0) of the TDD frame and the second subframe is subframe 5 (SF5) of the TDD frame. In some examples, the frame is an FDD frame. In some examples, the first subframe is subframe 0 (SF0) of the FDD frame and the second subframe is subframe 9 (SF9) of the FDD frame.

The channel mapper 1110 may map a first repetition of a portion of the PBCH to a symbol period of the first subframe, as described with reference to FIGS. 2-5. In some examples, the mapping the first repetition of the portion of the PBCH includes identifying a first symbol period of the first subframe that may be available for PBCH repetition, the first symbol period may have CRS. The channel mapper 1110 may also repeat at least one symbol of the first set of symbols during the first symbol period. The channel mapper 1110 may also repeat at least one symbol of the second set of symbols during the second symbol period. The channel mapper 1110 may also map each portion of the PBCH to the second subframe of the frame. The channel mapper 1110 may also map a second repetition of the portion of the PBCH to a symbol period of the second subframe, which may include CRS. In some examples, the CRS patterns of the first and second subframes each having a common CRS pattern and the portion of the PBCH may be mapped to corresponding sets of symbol periods in the first and second subframes. The channel mapper 1110 may also map a third repetition of a second portion of the PBCH to a symbol period of the second subframe without the CRS, and a subset of subcarriers exclude the PBCH in the symbol period of the second subframe. In some examples, the first and second subframes each having the same CRS pattern and each portion of the PBCH may be repeated an equal number of times across the first and second subframes. In some examples, the CRS patterns of the first and second subframes is the same CRS pattern, and the PBCH may be mapped to different sets of symbol periods in each of the first and second subframes. The channel mapper 1110 may also map a third repetition that has a portion of the PBCH to a symbol period of the second subframe without the CRS, wherein a subset of subcarriers exclude the PBCH in the symbol period of the second subframe. In some case, the PBCH is mapped based at least in part on a cell identification (ID).

Figure 12:
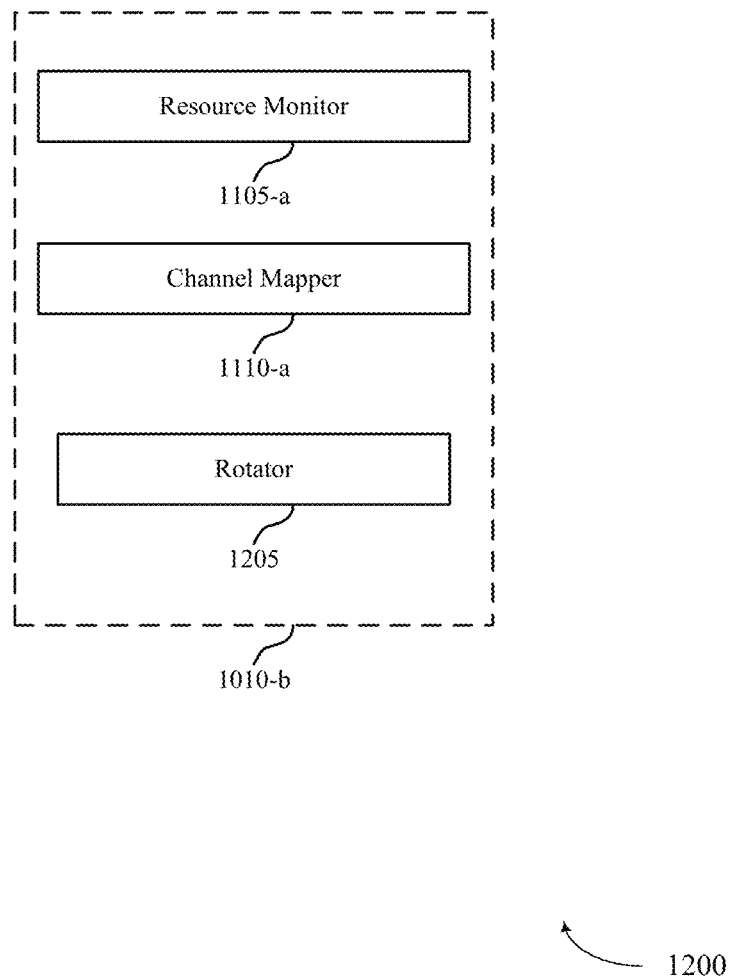

FIG. 12 shows a block diagram 1200 of a base station PBCH resource mapper 1010-b which may be a component of a wireless device 1000 or a wireless device 1100 that supports PBCH repetition for EMTC in accordance with various aspects of the present disclosure. The base station PBCH resource mapper 1010-b may be an example of aspects of a base station PBCH resource mapper 1010 described with reference to FIGS. 10-11. The base station PBCH resource mapper 1010-b may include a resource monitor 1105-a, and a channel mapper 1110-a. Each of these modules may perform the functions described with reference to FIG. 11. The base station PBCH resource mapper 1010-b may also include a rotator 1205.

The rotator 1205 may rotate each repeated portion of the PBCH by a phase based at least in part on a subcarrier index, a slot index, a cell identification, or a symbol index as described with reference to FIGS. 2-5.

Figure 13:
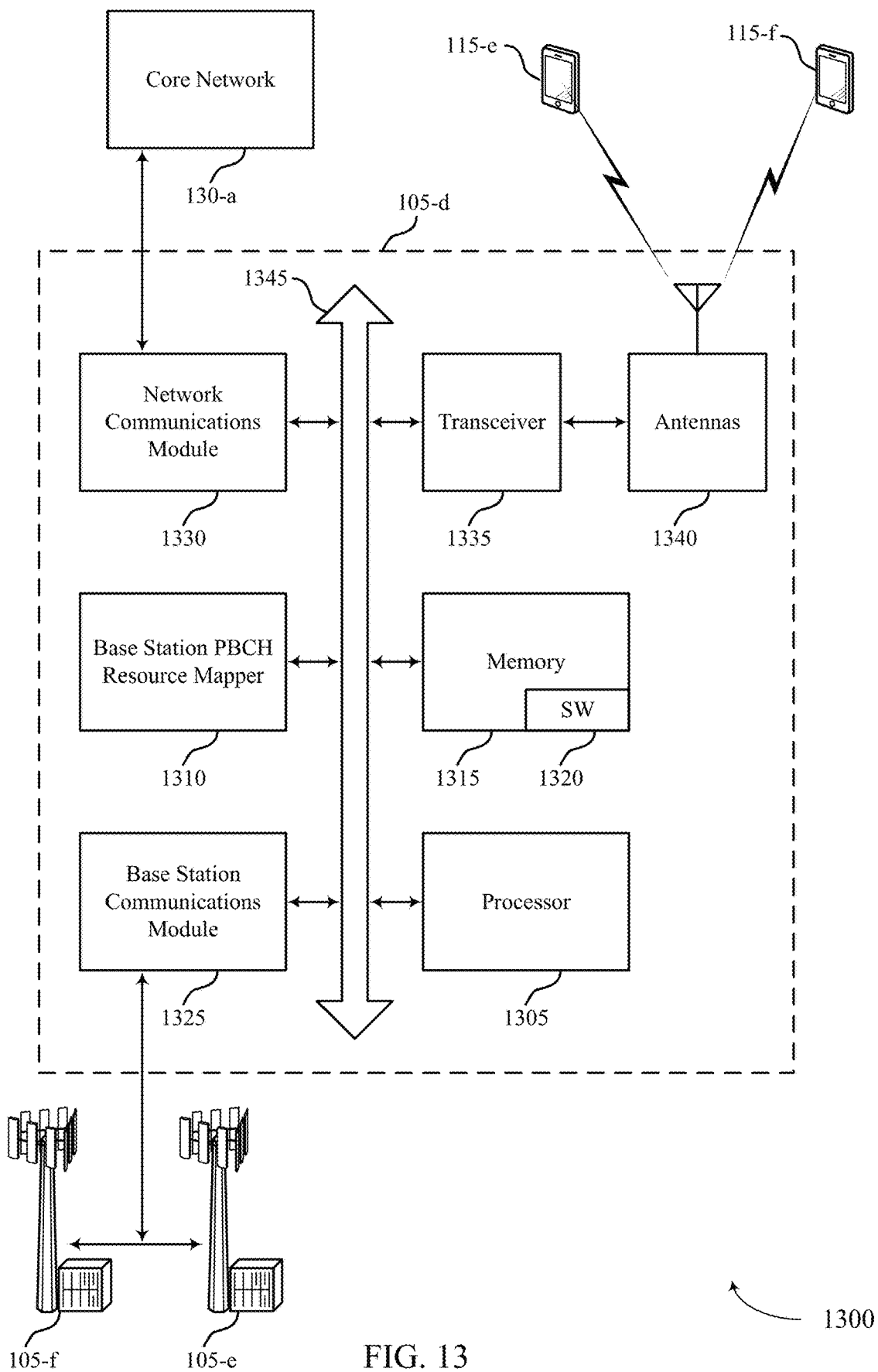
FIG. 13 illustrates a block diagram of a system including a base station that supports PBCH repetition for EMTC in accordance with various aspects of the present disclosure.

FIG. 13 shows a diagram of a system 1300, including a base station 105, that supports PBCH repetition in accordance with various aspects of the present disclosure. System 1300 may include base station 105-d, which may be an example of a wireless device 1000, a wireless device 1100, or a base station 105 described with reference to FIGS. 1, 2, and 10-12. Base station 105-d may include a base station PBCH resource mapper 1310, which may be an example of a base station PBCH resource mapper 1010 described with reference to FIGS. 10-12. Base station 105-*d* may also include components for bi-directional voice and data communications including components for transmitting communications and components for receiving communications. For example, base station 105-*d* may communicate bi-directionally with UE 115-*e*, UE 115-*f*, base station 105-*e*, or base station 105-*f*.

In some cases, base station 105-*d* may have one or more wired backhaul links. Base station 105-*d* may have a wired backhaul link (e.g., S1 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communications module 1325. In some examples, base station communications module 1325 may provide an X2 interface within a Long LTE/LTE-A wireless communication network technology to provide communication between some of the base stations 105. In some examples, base station 105-*d* may communicate with other base stations through core network 130. In some cases, base station 105-*d* may communicate with the core network 130 through network communications module 1330.

The base station 105-*d* may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-*d*) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-*d* may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor 1305 to perform various functions described herein (e.g., PBCH repetition, selecting coverage enhancement techniques, call processing, database management, message routing, etc.). Alternatively, the software 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, digital signal processor (DSPs), and the like.

The base station communications module 1325 may manage communications with other base stations 105. In some cases, base station communications module 1325 may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

The components of wireless device 600, wireless device 700, PBCH identifier 610-*b*, base station PBCH resource mapper 1010-*b* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
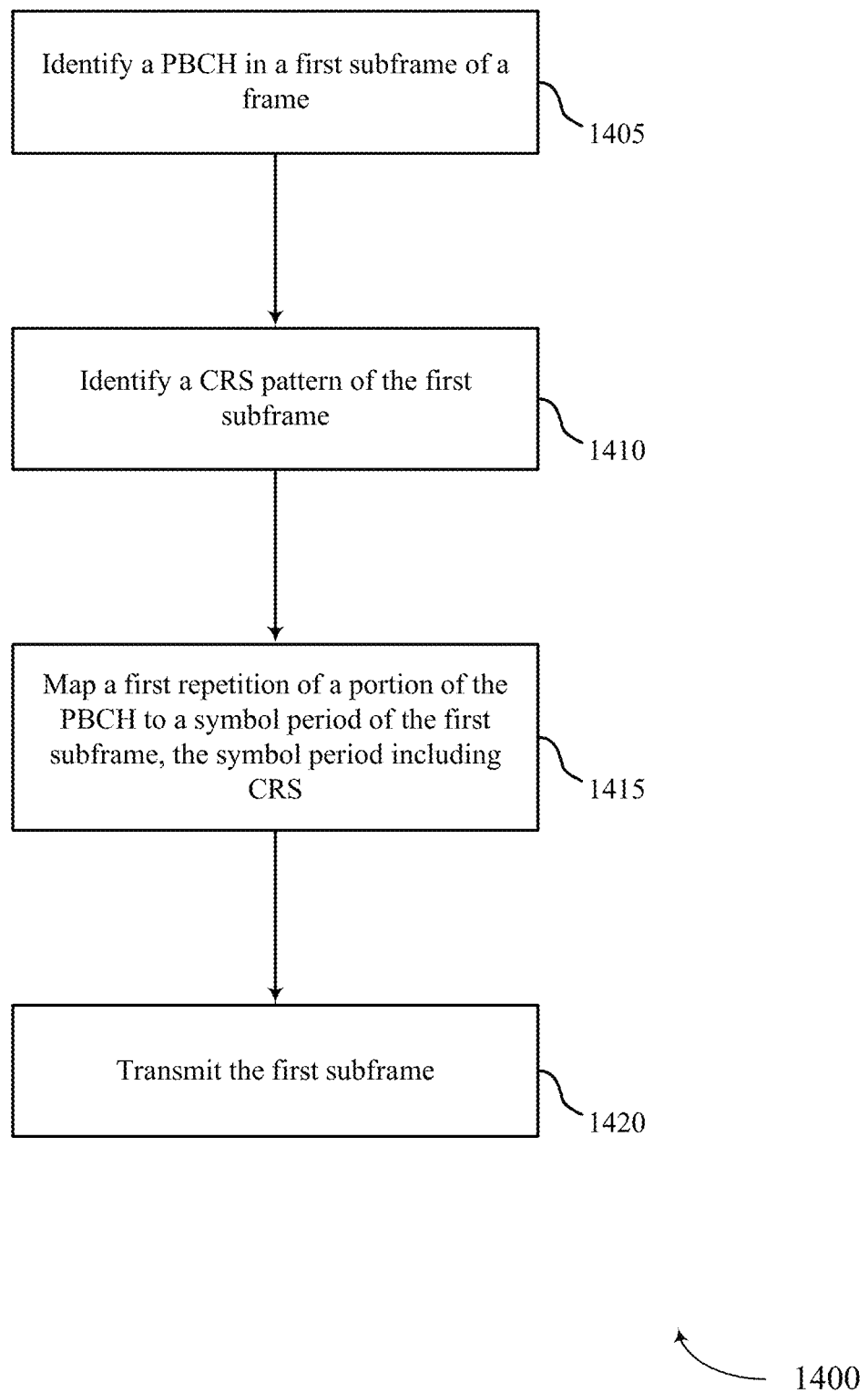
FIGS. 14-19 illustrate methods for PBCH repetition for EMTC in accordance with various aspects of the present disclosure.

FIG. 14 shows a flowchart illustrating a method 1400 for PBCH repetition in accordance with various aspects of the present disclosure. The operations of method 1400 may be implemented by a base station 105 or its components as described with reference to FIGS. 1-13. For example, the operations of method 1400 may be performed by the base station PBCH resource mapper 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware.

At block 1405, the base station 105 may identify a PBCH in a first subframe of a frame as described with reference to FIGS. 2-5. In certain examples, the operations of block 1405 may be performed by the resource monitor 1105 as described with reference to FIG. 11.

At block 1410, the base station 105 may identify a CRS pattern of the first subframe as described with reference to FIGS. 2-5. In certain examples, the operations of block 1410 may be performed by the resource monitor 1105 as described with reference to FIG. 11.

At block 1415, the base station 105 may map a first repetition of a portion of the PBCH to a symbol period of the first subframe—the symbol period may include CRS—as described with reference to FIGS. 2-5. In certain examples, the operations of block 1415 may be performed by the channel mapper 1110 as described with reference to FIG. 11.

At block 1420, the base station 105 may transmit the first subframe as described with reference to FIGS. 2-5. In certain examples, the operations of block 1420 may be performed by the transmitter 1015 as described with reference to FIG. 10.

Figure 15:
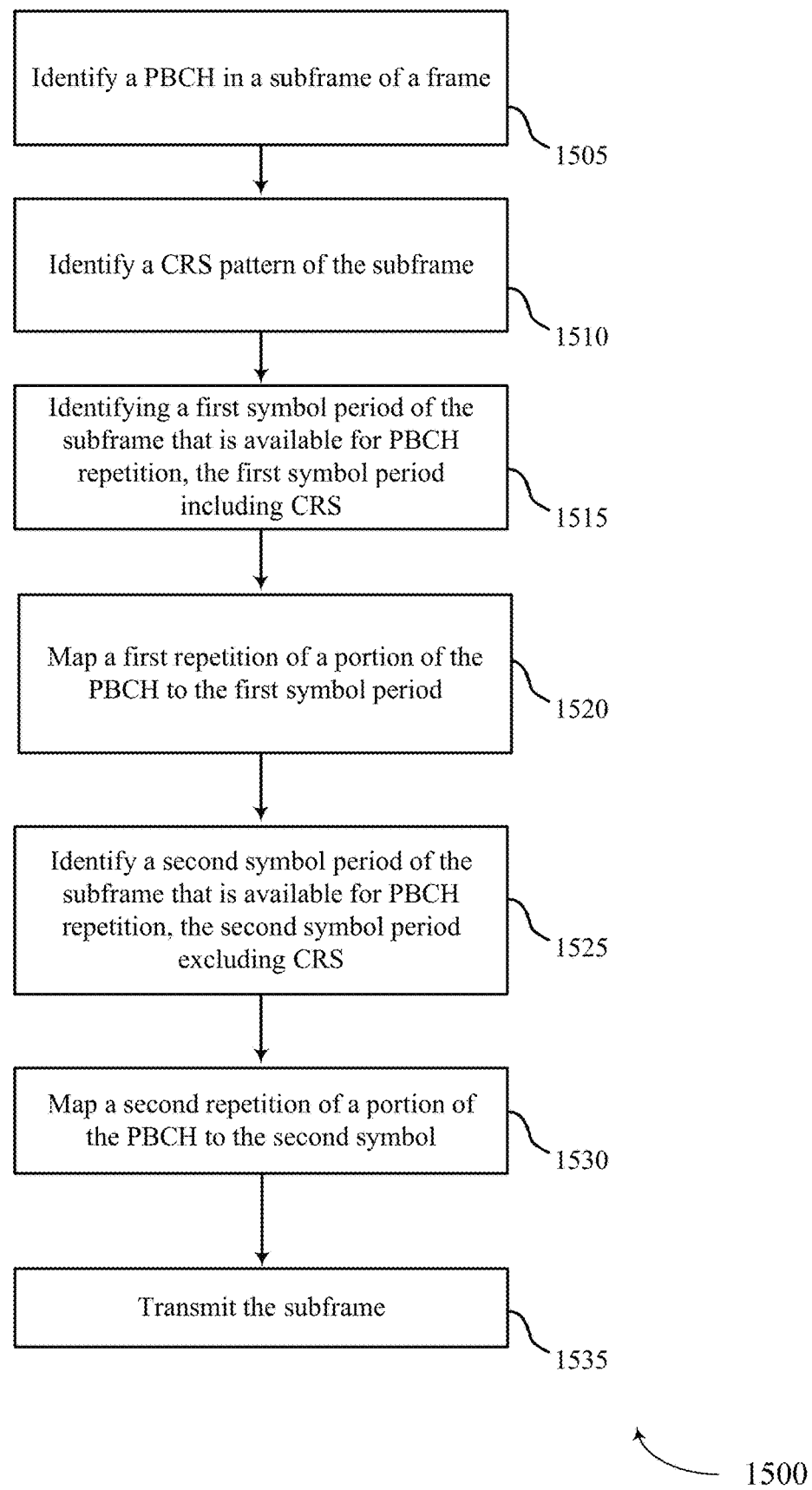

FIG. 15 shows a flowchart illustrating a method 1500 for PBCH repetition in accordance with various aspects of the present disclosure. The operations of method 1500 may be implemented by a base station 105 or its components as described with reference to FIGS. 1-13. For example, the operations of method 1500 may be performed by the base station PBCH resource mapper 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1500 may also incorporate aspects of method 1400 of FIG. 14.

At block 1505, the base station 105 may identify a PBCH in a subframe of a frame as described with reference to FIGS. 2-5. In certain examples, the operations of block 1505 may be performed by the resource monitor 1105 as described with reference to FIG. 11.

At block 1510, the base station 105 may identify a CRS pattern of the subframe as described with reference to FIGS. 2-5. In certain examples, the operations of block 1510 may be performed by the resource monitor 1105 as described with reference to FIG. 11.

At block 1515, the base station 105 may identify a first symbol period of the subframe that is available for PBCH repetition, the first symbol period may include CRS. In certain examples, the operations of block 1515 may be performed by the channel mapper 1110 as described with reference to FIG. 11.

At block 1520, the base station 105 may map a first repetition of a portion of the PBCH to a symbol period of the subframe, as described with reference to FIGS. 2-5. In certain examples, the operations of block 1520 may be performed by the channel mapper 1110 as described with reference to FIG. 11.

At block 1525, the base station 105 may identify a second symbol period that is available for PBCH repetition—the second symbol period may exclude CRS—as described with reference to FIGS. 2-5. In certain examples, the operations of block 1525 may be performed by the resource monitor 1105 as described with reference to FIG. 11.

At block 1530, the base station 105 may map a second repetition of a portion of the PBCH to the second symbol period as described with reference to FIGS. 2-5. In certain examples, the operations of block 1530 may be performed by the channel mapper 1110 as described with reference to FIG. 11.

At block 1535, the base station 105 may transmit the subframe as described with reference to FIGS. 2-5. In certain examples, the operations of block 1535 may be performed by the transmitter 1015 as described with reference to FIG. 10.

Figure 16:
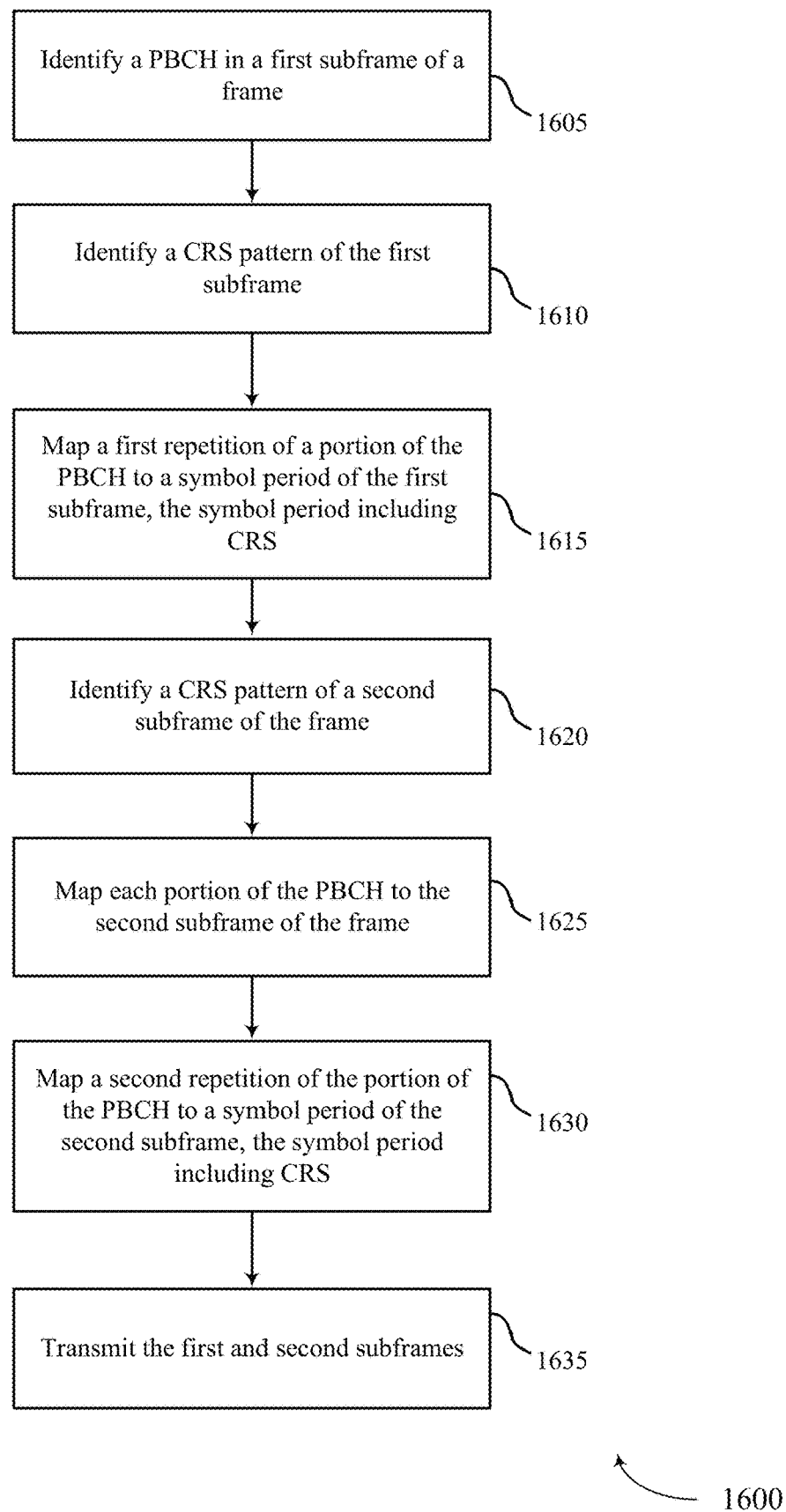

FIG. 16 shows a flowchart illustrating a method 1600 for PBCH repetition in accordance with various aspects of the present disclosure. The operations of method 1600 may be implemented by a base station 105 or its components as described with reference to FIGS. 1-13. For example, the operations of method 1600 may be performed by the base station PBCH resource mapper 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1600 may also incorporate aspects of methods 1400, and 1500 of FIGS. 14-15.

At block 1605, the base station 105 may identify a PBCH in a first subframe of a frame as described with reference to FIGS. 2-5. In certain examples, the operations of block 1605 may be performed by the resource monitor 1105 as described with reference to FIG. 11.

At block 1610, the base station 105 may identify a CRS pattern of the first subframe as described with reference to FIGS. 2-5. In certain examples, the operations of block 1610 may be performed by the resource monitor 1105 as described with reference to FIG. 11.

At block 1615, the base station 105 may map a first repetition of a portion of the PBCH to a symbol period, which may include CRS, of the first subframe as described with reference to FIGS. 2-5. In certain examples, the operations of block 1615 may be performed by the channel mapper 1110 as described with reference to FIG. 11.

At block 1620, the base station 105 may identify a CRS pattern of a second subframe of the frame as described with reference to FIGS. 2-5. In certain examples, the operations of block 1620 may be performed by the resource monitor 1105 as described with reference to FIG. 11.

At block 1625, the base station 105 may map each portion of the PBCH to the second subframe of the frame as described with reference to FIGS. 2-5. In certain examples, the operations of block 1625 may be performed by the channel mapper 1110 as described with reference to FIG. 11.

At block 1630, the base station 105 may map a second repetition of the portion of the PBCH to a symbol period of the second subframe, the symbol period may include CRS, as described with reference to FIGS. 2-5. In certain examples, the operations of block 1630 may be performed by the channel mapper 1110 as described with reference to FIG. 11

At block 1635, the base station 105 may transmit the first and second subframes as described with reference to FIGS. 2-5. In certain examples, the operations of block 1635 may be performed by the transmitter 1015 as described with reference to FIG. 10.

Figure 17:
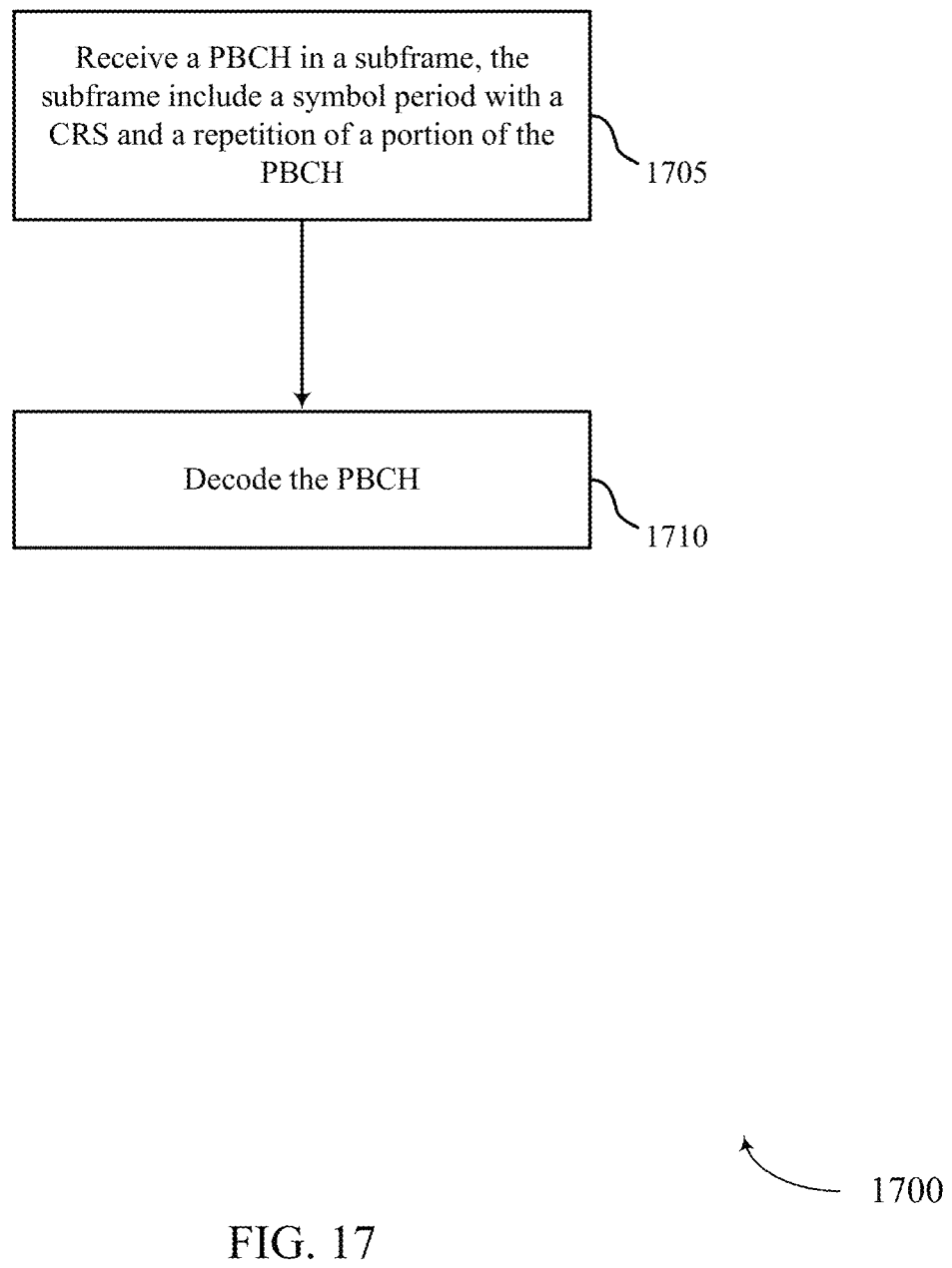

FIG. 17 shows a flowchart illustrating a method 1700 for PBCH repetition in accordance with various aspects of the present disclosure. The operations of method 1700 may be implemented by a UE 115 or its components as described with reference to FIGS. 1-9. For example, the operations of method 1700 may be performed by the PBCH identifier 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1705, the UE 115 may receive a PBCH in a subframe, and a symbol period of the subframe may include CRS and a repetition of a portion of the PBCH, as described with reference to FIGS. 2-5. In certain examples, the operations of block 1705 may be performed by the receiver 1005 as described with reference to FIG. 10.

At block 1710, the UE 115 may decode the PBCH as described with reference to FIGS. 2-5. In certain examples, the operations of block 1710 may be performed by the decoder 705 as described with reference to FIG. 11.

Figure 18:
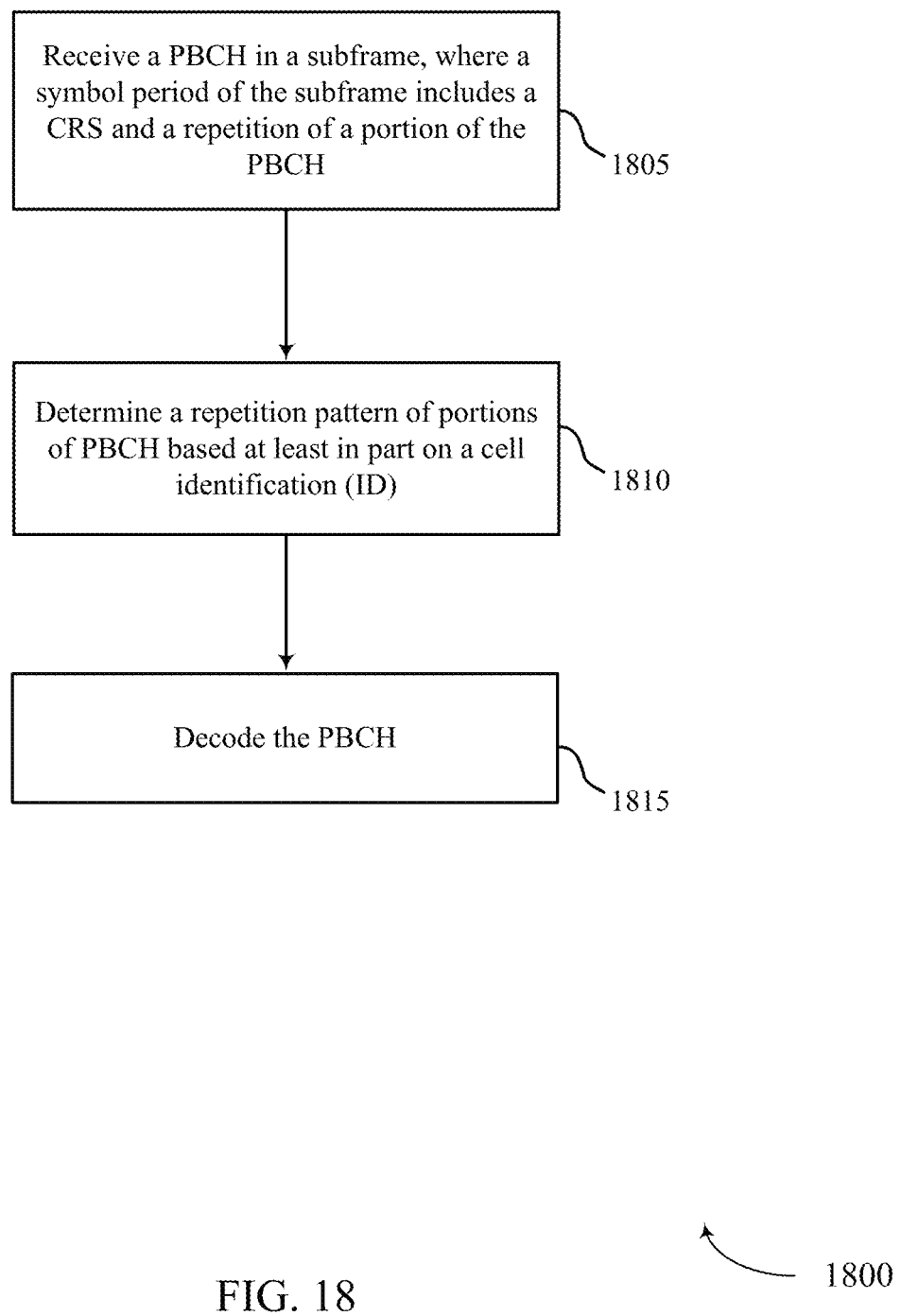

FIG. 18 shows a flowchart illustrating a method 1800 for PBCH repetition in accordance with various aspects of the present disclosure. The operations of method 1800 may be implemented by a UE 115 or its components as described with reference to FIGS. 1-9. For example, the operations of method 1800 may be performed by the base station PBCH resource mapper 1010 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of method 1700 of FIG. 17.

At block 1805, the UE 115 may receive a PBCH in a subframe, in some cases, the symbol period of the subframe includes CRS and a repetition of a portion of the PBCH as described with reference to FIGS. 2-5. In certain examples, the operations of block 1805 may be performed by the receiver 1005 as described with reference to FIG. 10.

At block 1810, the UE 115 may determine a repetition pattern of portions of PBCH based at least in part on a cell identification (ID) as described with reference to FIGS. 2-5. In certain examples, the operations of block 1815 may be performed by the channel monitor 1210 as described with reference to FIG. 12.

At block 1815, the UE 115 may decode the PBCH as described with reference to FIGS. 2-5. In certain examples, the operations of block 1810 may be performed by the decoder 705 as described with reference to FIG. 11.

Figure 19:
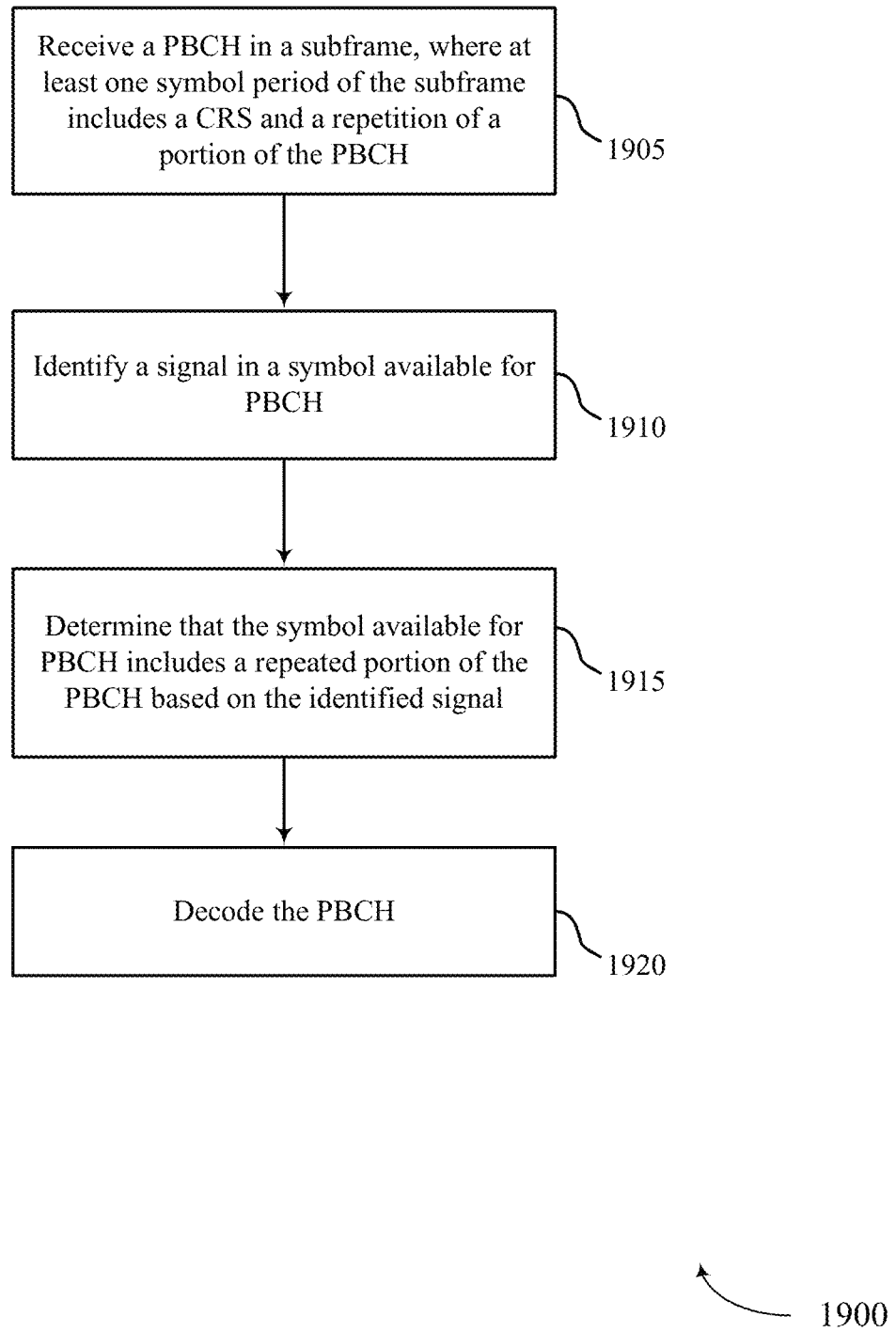

FIG. 19 shows a flowchart illustrating a method 1900 for PBCH repetition in accordance with various aspects of the present disclosure. The operations of method 1900 may be implemented by a UE 115 or its components as described with reference to FIGS. 1-9. For example, the operations of method 1900 may be performed by PBCH identifier 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1700 and 1800 of FIGS. 17 and 18.

At block 1905, the UE 115 may receive a PBCH in a subframe, where at least one symbol period of the subframe includes a CRS and a repetition of a portion of the PBCH as described with reference to FIGS. 2-5. In some cases, receiving the PBCH in the subframe includes receiving the repetition of a portion of the PBCH in the subframe. In certain examples, the operations of block 1905 may be performed by the receiver 1005 as described with reference to FIG. 10.

At block 1910, the UE 115 may identify a signal in a symbol available for PBCH as described with reference to FIGS. 2-5. In certain examples, the operations of block 1910 may be performed by the channel monitor 1210 as described with reference to FIG. 12.

At block 1915, the UE 115 may determine that the symbol available for PBCH has a repeated portion of the PBCH based on the identified signal, as described with reference to FIGS. 2-5. In certain examples, the operations of block 1915 may be performed by the channel monitor 1210 as described with reference to FIG. 12.

At block 1920, the UE 115 may decode the PBCH as described with reference to FIGS. 2-5. In certain examples, the operations of block 1920 may be performed by the decoder 705 as described with reference to FIG. 11. In some examples, decoding the PBCH may including blindly detecting the PBCH, which may include determining a repetition pattern of the portion of the PBCH and monitoring for the PBCH in a subframe based at least in part on the repetition pattern of the portion of the PBCH. Monitoring for the PBCH may include identifying a set of candidate locations in a subframe for the PBCH based at least in part on the repetition pattern.

Thus, methods 1400, 1500, 1600, 1700, 1800, and 1900 may provide for PBCH repetition for EMTC. It should be noted that methods 1400, 1500, 1600, 1700, 1800, and 1900 describe possible implementation, and that the operations and the steps may be rearranged or otherwise modified such that other implementations are possible. In some examples, aspects from two or more of the methods 1400, 1500, 1600, 1700, 1800, and 1900 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   identifying a physical broadcast channel (PBCH) in a first subframe of a frame;
   identifying a first repetition pattern for mapping repetitions of at least a first portion of the PBCH to one or more first symbols of a frequency division duplex (FDD) frame;
   identifying a second repetition pattern, different from the first repetition pattern, for mapping repetitions of at least a second portion of the PBCH to one or more second symbols of a time division duplex (TDD) frame;
   identifying a frame type of a plurality of different frame types and a cell-specific reference signal (CRS) pattern of the first subframe, wherein the identified frame type is one of an FDD frame type or a TDD frame type;
   mapping, in accordance with the first repetition pattern or the second repetition pattern based at least in part on the identified frame type, a first repetition of the first portion or the second portion of the PBCH to a symbol period in one of a first slot or a second slot of the first subframe that is selected based at least in part on the identified frame type, wherein the symbol period of the selected slot of the first subframe comprises a CRS; and
   transmitting the first subframe.

2. The method of claim 1, wherein identifying the PBCH in the first subframe comprises:
   identifying a first set of symbols comprising portions of the PBCH and the CRS; and
   identifying a second set of symbols comprising portions of the PBCH without the CRS.

3. The method of claim 2, wherein mapping the first repetition of the first portion or the second portion of the PBCH comprises:
   identifying a first symbol period of the first subframe that is available for PBCH repetition, the first symbol period comprising the CRS; and
   repeating at least one symbol of the first set of symbols during the first symbol period.

4. The method of claim 3, further comprising:
   identifying a second symbol period that is available for PBCH repetition, the second symbol period excluding the CRS; and
   repeating at least one symbol of the second set of symbols during the second symbol period.

5. The method of claim 1, further comprising:
   identifying a CRS pattern of a second subframe of the frame;
   mapping each portion of the PBCH to the second subframe of the frame;
   mapping a second repetition of the first portion or the second portion of the PBCH to a symbol period of the second subframe, the symbol period of the second subframe comprising the CRS; and
   transmitting the second subframe.

6. The method of claim 5, wherein the CRS patterns of the first and second subframes each comprise a same CRS pattern and the first portion or the second portion of the PBCH is mapped to corresponding sets of symbol periods in the first and second subframes.

7. The method of claim 6, further comprising:
   mapping a third repetition of the first portion or the second portion of the PBCH to a symbol period of the second subframe without the CRS, wherein a subset of subcarriers excludes the PBCH in the symbol period of the second subframe without the CRS.

8. The method of claim 5, wherein the first and second subframes each comprise a same CRS pattern and each portion of the PBCH is repeated an equal number of times across the first and second subframes.

9. The method of claim 5, wherein the CRS patterns of the first and second subframes each comprise a same CRS pattern and the PBCH is mapped to different sets of symbol periods in each of the first and second subframes.

10. The method of claim 9, further comprising:
    mapping a third repetition of the first portion or the second portion of the PBCH to a symbol period of the second subframe without the CRS, wherein a subset of subcarriers excludes the PBCH in the symbol period of the second subframe without the CRS.

11. A method of wireless communication, comprising:
    receiving a physical broadcast channel (PBCH) in a subframe, the subframe being a first subframe contained within a frame having a frame type, wherein a first repetition pattern of repetitions of at least a first portion of the PBCH is in one or more first symbols of a frequency division duplex (FDD) frame, and wherein a second repetition pattern, different from the first repetition pattern, of repetitions of at least a second portion of the PBCH is in one or more second symbols of a time division duplex (TDD) frame;
    determining that a location of a symbol period of the subframe is in one of:
      a first slot of the subframe in accordance with the first repetition pattern when the frame type is an FDD frame type, or
      a second slot of the subframe in accordance with the second repetition pattern when the frame type is a TDD frame type, the symbol period comprising a reference signal and a repetition of the first portion or the second portion of the PBCH; and
    decoding the PBCH.

12. The method of claim 11, further comprising:
    determining a repetition pattern of the first portion or the second portion of the PBCH; and monitoring for the PBCH in the subframe based at least in part on the determined repetition pattern of the first portion or the second portion of the PBCH.

13. The method of claim 12, wherein monitoring for the PBCH in the subframe based at least in part on the determined repetition pattern comprises:
identifying a set of candidate locations in the subframe for the PBCH based at least in part on the determined repetition pattern.

14. The method of claim 11, further comprising:
de-rotating symbols comprising the repetition of the first portion or the second portion of the PBCH by a phase based at least in part on a cell identification, a subcarrier index, a slot index, or a symbol index.

15. The method of claim 11, wherein receiving the PBCH in the subframe comprises receiving the repetition of the first portion or the second portion of the PBCH in the subframe.

16. The method of claim 15, further comprising:
estimating a frequency using at least the repetition of the first portion or the second portion of the PBCH.

17. The method of claim 16, wherein the frequency estimation is based at least in part on the reference signal.

18. The method of claim 15, further comprising:
identifying a signal in a symbol available for the PBCH; and
determining that the symbol available for the PBCH comprises the repetition of the first portion or the second portion of the PBCH based at least in part on the identified signal.

19. An apparatus for wireless communication, comprising:
means for identifying a physical broadcast channel (PBCH) in a first subframe of a frame;
means for identifying a first repetition pattern for mapping repetitions of at least a first portion of the PBCH to one or more first symbols of a frequency division duplex (FDD) frame;
means for identifying a second repetition pattern, different from the first repetition pattern, for mapping repetitions of at least a second portion of the PBCH to one or more second symbols of a time division duplex (TDD) frame;
means for identifying a frame type of a plurality of different frame types and a cell-specific reference signal (CRS) pattern of the first subframe, wherein the identified frame type is one of an FDD frame type or a TDD frame type;
means for mapping, in accordance with the first repetition pattern or the second repetition pattern based at least in part on the identified frame type, a first repetition of the first portion or the second portion of the PBCH to a symbol period in one of a first slot or a second slot of the first subframe that is selected based at least in part on the identified frame type, wherein the symbol period of the selected slot of the first subframe comprises a CRS; and
means for transmitting the first subframe.

20. The apparatus of claim 19, further comprising:
means for identifying a CRS pattern of a second subframe of the frame;
means for mapping each portion of the PBCH to the second subframe of the frame;
means for mapping a second repetition of the first portion or the second portion of the PBCH to a symbol period of the second subframe, the symbol period of the second subframe comprising the CRS; and
means for transmitting the second subframe.

21. The apparatus of claim 20, wherein the CRS patterns of the first and second subframes each comprise a same CRS pattern and the means for mapping the first repetition and the means for mapping the second repetition are operable to map the PBCH to different sets of symbol periods in each of the first and second subframes.

22. An apparatus for wireless communication, comprising:
means for receiving a physical broadcast channel (PBCH) in a subframe, the subframe being a first subframe contained within a frame having a frame type, wherein a first repetition pattern of repetitions of at least a first portion of the PBCH is in one or more first symbols of a frequency division duplex (FDD) frame, and wherein a second repetition pattern, different from the first repetition pattern, of repetitions of at least a second portion of the PBCH is in one or more second symbols of a time division duplex (TDD) frame;
means for determining that a location of a symbol period of the subframe is in one of:
a first slot of the subframe in accordance with the first repetition pattern when the frame type is an FDD frame type, or
a second slot of the subframe in accordance with the second repetition pattern when the frame type is a TDD frame type, the symbol period comprising a reference signal and a repetition of a portion of the PBCH; and
means for decoding the PBCH.

23. The apparatus of claim 22, wherein the means for decoding the PBCH comprises:
means for blindly detecting the PBCH.

24. An apparatus for wireless communication, comprising:
a processor;
memory in electronic communication with the processor; and
instructions stored in the memory and operable, when executed by the processor, to cause the apparatus to:
identify a physical broadcast channel (PBCH) in a first subframe of a frame;
identify a first repetition pattern for mapping repetitions of at least a first portion of the PBCH to one or more first symbols of a frequency division duplex (FDD) frame;
identify a second repetition pattern, different from the first repetition pattern, for mapping repetitions of at least a second portion of the PBCH to one or more second symbols of a time division duplex (TDD) frame;
identify a frame type of a plurality of different frame types and a cell-specific reference signal (CRS) pattern of the first subframe, wherein the identified frame type is one of an FDD frame type or a TDD frame type;
map, in accordance with the first repetition pattern or the second repetition pattern based at least in part on the identified frame type, a first repetition of the first portion or the second portion of the PBCH to a symbol period in one of a first slot or a second slot of the first subframe that is selected based at least in part on the identified frame type, wherein the symbol period of the selected slot of the first subframe comprises a CRS; and
transmit the first subframe.

25. The apparatus of claim 24, wherein the instructions are operable to cause the apparatus to:
- identify a first set of symbols comprising portions of the PBCH and the CRS; and
- identify a second set of symbols comprising portions of the PBCH without the CRS.

26. The apparatus of claim 25, wherein the instructions are operable to cause the apparatus to:
- identify a first symbol period of the first subframe that is available for PBCH repetition, the first symbol period comprising the CRS; and
- repeat at least one symbol of the first set of symbols during the first symbol period.

27. The apparatus of claim 26, wherein the instructions are operable to cause the apparatus to:
- identify a second symbol period that is available for PBCH repetition, the second symbol period excluding the CRS; and
- repeat at least one symbol of the second set of symbols during the second symbol period.

28. The apparatus of claim 24, wherein the instructions are operable to cause the apparatus to:
- identify a CRS pattern of a second subframe of the frame;
- map each portion of the PBCH to the second subframe of the frame;
- map a second repetition of the first portion or the second portion of the PBCH to a symbol period of the second subframe, the symbol period of the second subframe comprising the CRS; and
- transmit the second subframe.

29. The apparatus of claim 28, wherein the CRS patterns of the first and second subframes each comprise a same CRS pattern and the first portion or the second portion of the PBCH is mapped to corresponding sets of symbol periods in the first and second subframes.

30. The apparatus of claim 29, wherein the instructions are operable to cause the apparatus to:
- map a third repetition of the first portion or the second portion of the PBCH to a symbol period of the second subframe without the CRS, wherein a subset of subcarriers excludes the PBCH in the symbol period of the second subframe without the CRS.

31. The apparatus of claim 28, wherein the first and second subframes each comprise a same CRS pattern and each portion of the PBCH is repeated an equal number of times across the first and second subframes.

32. The apparatus of claim 28, wherein the CRS patterns of the first and second subframes each comprise a same CRS pattern and the PBCH is mapped to different sets of symbol periods in each of the first and second subframes.

33. The apparatus of claim 32, wherein the instructions are operable to cause the apparatus to:
- map a third repetition comprising the first portion or the second portion of the PBCH to a symbol period of the second subframe without the CRS, wherein a subset of subcarriers excludes the PBCH in the symbol period of the second subframe without the CRS.

34. An apparatus for wireless communication, comprising:
- a processor;
- memory in electronic communication with the processor; and
- instructions stored in the memory and operable, when executed by the processor, to cause the apparatus to:
  - receive a physical broadcast channel (PBCH) in a subframe, the subframe being a first subframe contained within a frame having a frame type, wherein a first repetition pattern of repetitions of at least a first portion of the PBCH is in one or more first symbols of a frequency division duplex (FDD) frame, and wherein a second repetition pattern, different from the first repetition pattern, of repetitions of at least a second portion of the PBCH is in one or more second symbols of a time division duplex (TDD) frame;
  - determine that a location of a symbol period of the subframe is in one of:
    - a first slot of the subframe in accordance with the first repetition pattern when the frame type is an FDD frame type, or
    - a second slot of the subframe in accordance with the second repetition pattern when the frame type is a TDD frame type, the symbol period comprising a reference signal and a repetition of the first portion or the second portion of the PBCH; and
  - decode the PBCH.

35. The apparatus of claim 34, wherein the instructions are operable to cause the apparatus to:
- determine a repetition pattern of the first portion or the second portion of the PBCH; and
- monitor for the PBCH in the subframe based at least in part on the determined repetition pattern of the first portion or the second portion of the PBCH.

36. The apparatus of claim 35, wherein the instructions are operable to cause the apparatus to:
- identify a set of candidate locations in the subframe for the PBCH based at least in part on the determined repetition pattern.

37. The apparatus of claim 34, wherein the instructions are operable to cause the apparatus to:
- de-rotate symbols comprising the repetition of the first portion or the second portion of the PBCH by a phase based at least in part on a cell identification, a subcarrier index, a slot index, or a symbol index.

38. The apparatus of claim 34, wherein the instructions are operable to cause the apparatus to:
- receive the PBCH in the subframe comprises receiving the repetition of the first portion or the second portion of the PBCH in the subframe.

39. The apparatus of claim 38, wherein the instructions are operable to cause the apparatus to:
- estimate a frequency using at least the repetition of the first portion or the second portion of the PBCH.

40. The apparatus of claim 38, wherein the instructions are operable to cause the apparatus to:
- identify a signal in a symbol available for the PBCH; and
- determine that the symbol available for the PBCH comprises the repetition of the first portion or the second portion of the PBCH based at least in part on the identified signal.

41. A non-transitory computer-readable medium storing code for wireless communication, the code comprising instructions that when executed by a processor cause an apparatus to:
- identify a physical broadcast channel (PBCH) in a first subframe of a frame;
- identify a first repetition pattern for mapping repetitions of at least a first portion of the PBCH to one or more first symbols of a frequency division duplex (FDD) frame;
- identify a second repetition pattern, different from the first repetition pattern, for mapping repetitions of at least a second portion of the PBCH to one or more second symbols of a time division duplex (TDD) frame;

identify a frame type of a plurality of different frame types and a cell-specific reference signal (CRS) pattern of the first subframe, wherein the identified frame type is one of an FDD frame type or a TDD frame type;

map, in accordance with the first repetition pattern or the second repetition pattern based at least in part on the identified frame type, a first repetition of the first portion or the second portion of the PBCH to a symbol period in one of a first slot or a second slot of the first subframe that is selected based at least in part on the identified frame type, wherein the symbol period of the selected slot of the first subframe comprises a CRS; and transmit the first subframe.

42. A non-transitory computer-readable medium storing code for wireless communication, the code comprising instructions that when executed by a processor cause an apparatus to:

receive a physical broadcast channel (PBCH) in a subframe, the subframe being a first subframe contained within a frame having a frame type, wherein a first repetition pattern of repetitions of at least a first portion of the PBCH is in one or more first symbols of a frequency division duplex (FDD) frame, and wherein a second repetition pattern, different from the first repetition pattern, of repetitions of at least a second portion of the PBCH is in one or more second symbols of a time division duplex (TDD) frame;

determine that a location of a symbol period of the subframe is in one of:
  a first slot of the subframe in accordance with the first repetition pattern when the frame type is an FDD type, or
  a second slot of the subframe in accordance with the second repetition pattern when the frame type is a TDD frame type, the symbol period comprising a reference signal and a repetition of the first portion or the second portion of the PBCH; and decode the PBCH.

43. The method of claim 1, wherein the plurality of different frame types comprises the frequency division duplex (FDD) frame type and the time division duplex (TDD) frame type.

44. The method of claim 1, further comprising:
mapping the first repetition to a first number of symbol periods in the subframe and a second repetition of another portion of the PBCH to a second number of symbol periods in the subframe that is different than the first number of symbol periods.

* * * * *